(12) United States Patent
Komuro et al.

(10) Patent No.: US 8,276,908 B2
(45) Date of Patent: Oct. 2, 2012

(54) RECORDING APPARATUS

(75) Inventors: Shintaro Komuro, Shiojiri (JP); Nobuhiko Shinozaki, Shiojiri (JP); Tomoya Takikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 532 days.

(21) Appl. No.: 12/471,863

(22) Filed: May 26, 2009

(65) Prior Publication Data

US 2009/0300664 A1    Dec. 3, 2009

(30) Foreign Application Priority Data

May 27, 2008  (JP) ................ 2008-138748
Aug. 12, 2008 (JP) ................ 2008-207951
Feb. 5, 2009   (JP) ................ 2009-024561

(51) Int. Cl.
  *B65H 31/26* (2006.01)
  *B65H 33/04* (2006.01)
  *B65H 31/00* (2006.01)
  *B65H 29/00* (2006.01)
  *B41J 2/01* (2006.01)

(52) U.S. Cl. ............... 271/220; 270/58.08; 270/58.12; 271/207; 271/279; 347/104

(58) Field of Classification Search .............. None
See application file for complete search history.

(56) References Cited

U.S. PATENT DOCUMENTS
2008/0094987 A1*  4/2008  Oshida et al. .......... 369/75.11

FOREIGN PATENT DOCUMENTS
JP  2005-059584      3/2005
JP  2005059584 A  *  3/2005

* cited by examiner

*Primary Examiner* — Stephen Meier
*Assistant Examiner* — Alexander C Witkowski
(74) *Attorney, Agent, or Firm* — Workman Nydegger

(57) ABSTRACT

A recording apparatus includes a tray in which a recording material is to be set, the tray being reciprocated between a first position where the tray is exposed to allow the recording material to be set therein and a second position shifted from the first position in a first direction, where the tray is stored; a transporting mechanism that applies transportation force for reciprocating the tray; and a transportation-force transmitting member that is connected to the tray to mediate transmission of the transportation force to the tray and is capable of increasing or decreasing a space occupied by the transportation-force transmitting member in the direction of reciprocation.

11 Claims, 26 Drawing Sheets

FIG. 3

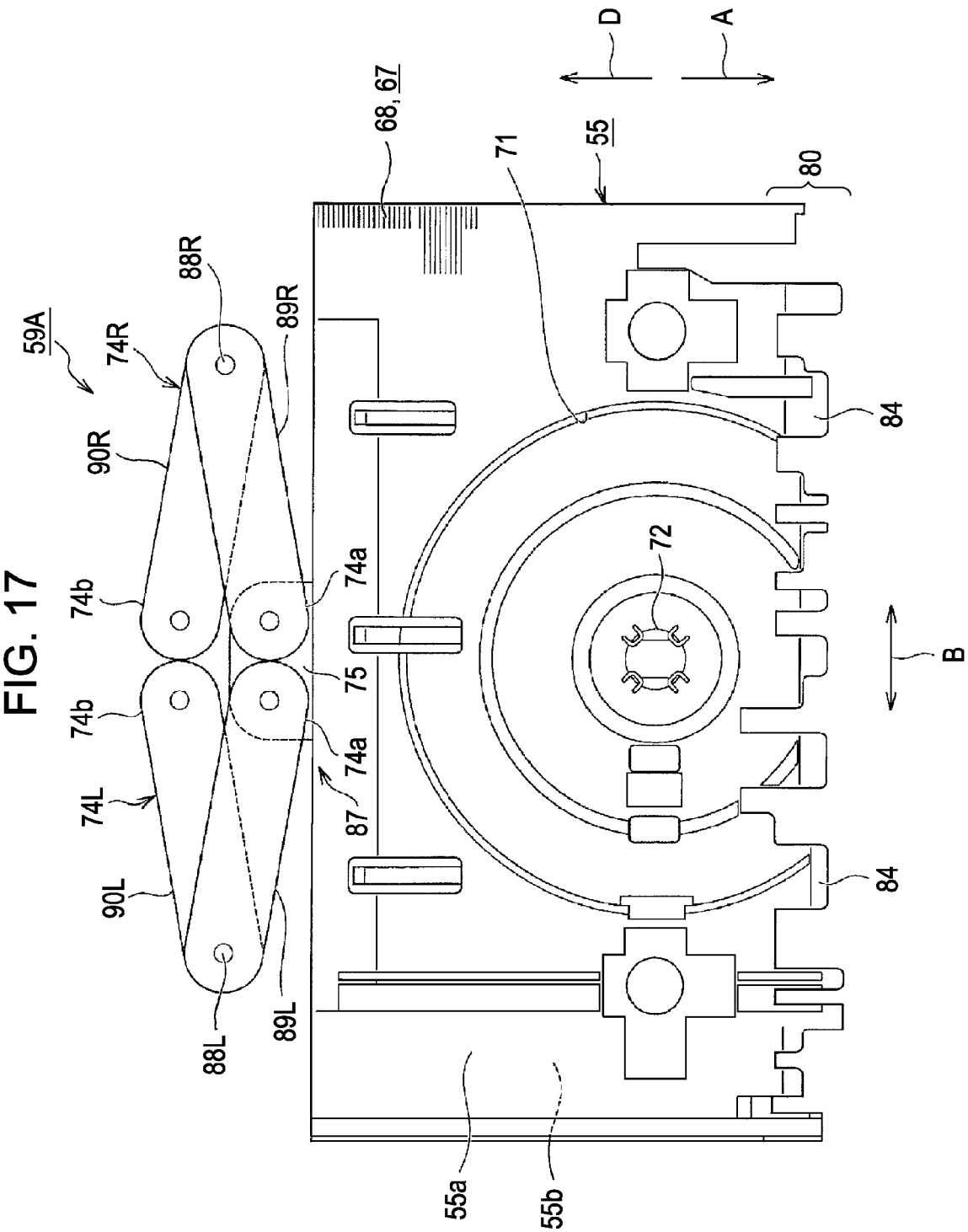

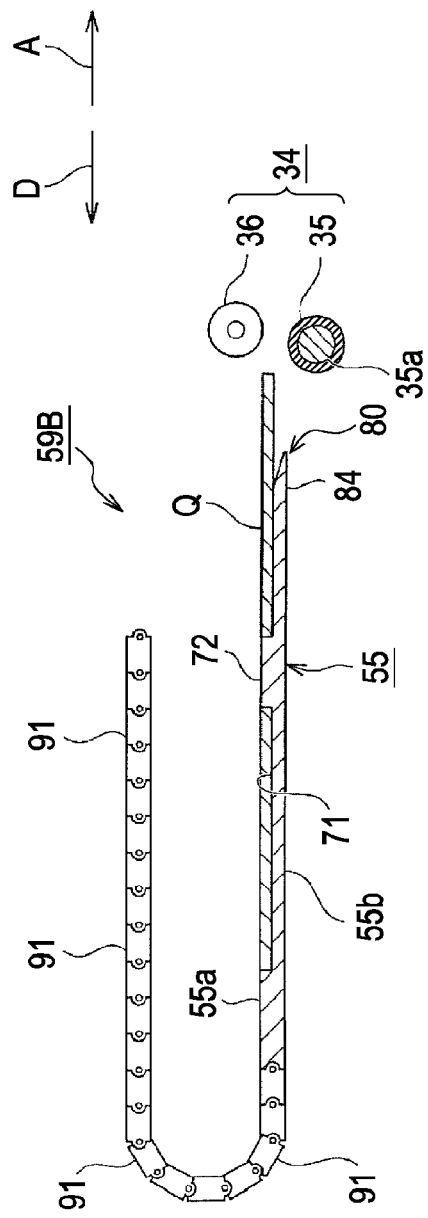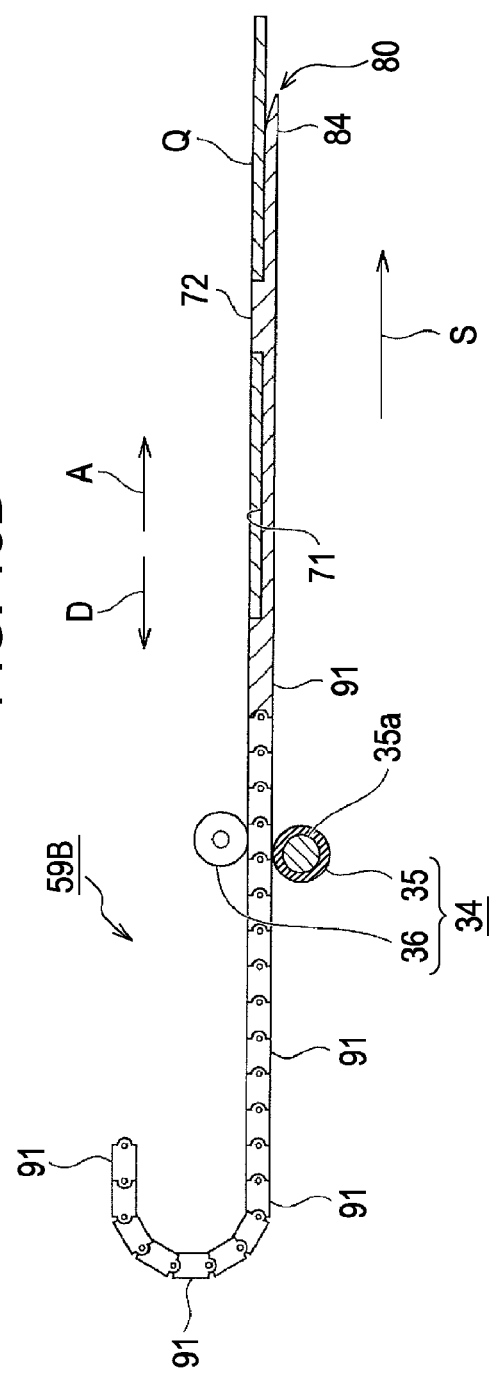

RECORDING APPARATUS

BACKGROUND

1. Technical Field

The present invention relates to recording apparatuses, such as printers, facsimiles, or copiers, including multi-function apparatuses, having a tray accommodated in a main body of the recording apparatus. A recording material on which recording is performed, such as an optical disc, can be set in the tray.

2. Related Art

An ink jet printer as an example of a recording apparatus will be described below. Some ink jet printers can selectively perform recording on both soft recording materials that do not stand on their own, such as sheets or films, and hard recording materials that stand on their own, such as optical discs (CD-Rs, DVD-Rs, and the like). When recording is to be performed on a recording material such as a CD-R, a dedicated tray that is separately provided as an accessory is used, or, as disclosed in Japanese Unexamined Patent Application Publication No. 2005-59584, an ink jet printer having a tray accommodated in the main body of the printer is used. The tray has a setting recess in which a recording material, such as a CD-R, is set.

However, because such a printer having a built-in tray reciprocates the tray over a wide area between a set position and a stored position, it uses a long tray having a great length in the direction in which the tray reciprocates (hereinafter, "depth"). A great depth of the tray increases the depth of the main body of the printer, making it difficult to reduce the size of the main body of the recording apparatus.

SUMMARY

An advantage of some aspects of the invention is that it provides a recording apparatus that enables the use of a short tray having a small depth to reduce the size of a main body of the recording apparatus.

According to a first aspect of the invention, a recording apparatus includes a holding tray accommodated in a main body of the recording apparatus, in which a recording material can be set; a reciprocation path extending between a set position and a stored position of the holding tray and guides the holding tray reciprocating therebetween; a transporting mechanism provided in the reciprocation path, which transports the holding tray; and a recording execution unit that performs recording on the recording material transported to a recording execution area. The holding tray is formed so as to be shorter than the moving distance over which it reciprocates, and has an extendable moving mechanism that enables the holding tray to move over the moving distance.

According to this embodiment, the use of the extendable moving mechanism enables the use of a short holding tray formed so as to be shorter than the entire moving distance over which the holding tray reciprocates. This enables the short holding tray to be moved from the stored position at the back of the main body of the recording apparatus to the set position at the front of the main body of the recording apparatus over a large stroke. This can reduce the size of recording apparatuses having a holding tray accommodated therein.

According to a second aspect of the invention, in the recording apparatus according to the first aspect, the extendable moving mechanism includes a guide arm connected to an end of the holding tray so as to change the inclination thereof with respect to the direction of reciprocation of the holding tray, and a guide portion engaged with the guide arm to guide the guide arm to change the inclination and move.

According to this embodiment, the use of the guide rail and the guide arm capable of changing its inclination enables the guide arm to be folded and stored along the rear end of the holding tray when the holding tray is located at the stored position. On the other hand, when the holding tray is moved to the set position, the guide arm extends straight in the conveying direction. Furthermore, the extendable moving mechanism consisting of a small number of components can be formed with a relatively simple structure.

According to a third aspect of the invention, in the recording apparatus according to the second aspect, the guide arm includes a plurality of guide arms, and the plurality of guide arms overlie each other when the holding tray is located at the stored position.

According to this embodiment, the provision of the plurality of guide arms stabilizes the orientation of the holding tray during transportation and enables accurate and smooth transportation of the recording material. Furthermore, by storing the plurality of guide arms so as to overlie each other when the holding tray is located at the stored position, the size of the main body of the recording apparatus in a depth direction can be further reduced. In addition, by providing the guide arms with engaging step portions, the guide arms, when they overlie each other, have a thickness equivalent to one guide arm. This reduces the height of the main body of the recording apparatus.

According to a fourth aspect of the invention, in the recording apparatus according to the second or third aspect, the guide portion is provided in one or both of path-forming members disposed so as to face each other to form the reciprocation path. In the case where a plurality of guide portions are provided, one of the guide arms is engaged with the guide portion in one of the path-forming members, and the other of the guide arm is engaged with the guide portion in the other of the path-forming members.

According to this embodiment, because the guide portion is formed using the existing path-forming members, the number of components is reduced. Furthermore, for example, by engaging the upper guide arm (one of the guide arms) with the guide portion in the upper path-forming member (one of the path-forming members) and by engaging the lower guide arm (the other one of the guide arms) with the guide portion in the lower path-forming member (the other one of the path-forming members), the guide arms are efficiently arranged while preventing interference between the guide arms and reducing the height of the main body of the recording apparatus.

According to a fifth aspect of the invention, in the recording apparatus according to any one of the second to fourth aspects, when the recording material moves between the recording termination position in the recording execution area and the set position, the holding tray is transported by the guide arm that receives transportation force from the transporting mechanism.

According to this embodiment, by using the guide arm as a transportation-force transmitting member for applying transportation force to the holding tray, a long movement stroke can be achieved even when a short holding tray is used.

According to a sixth aspect of the invention, in the recording apparatus according to the fifth aspect, a surface of the guide arm to be in contact with a transportation driving roller constituting the transporting mechanism, at least in an area which receives transportation force from the transporting mechanism, is formed in a flat surface.

According to this embodiment, in a moving area where the guide arm functions as the transportation-force transmitting member, a contact surface of the guide arm to be in contact with the transportation driving roller is formed in a flat surface having no step portion. Thus, smooth transportation of the holding tray in the moving area is achieved.

According to a seventh aspect of the invention, in the recording apparatus according to any one of the second to sixth aspects, when the guide arm includes a plurality of guide arms, the positional relationship between the holding tray and the guide arm at one connection portion of the holding tray and the guide arm is different from that at the other connection portion.

There are slight steps at the connection portions of the holding tray and the guide arms even if they are designed and formed to be flush with each other. According to this embodiment, because the positional relationship between the holding tray and the guide arm at one connection portion is different from that at the other connection portion, the steps are compensated for and thus exert almost no influence. That is, the influence of the steps on transportation of the holding tray can be reduced.

According to an eighth aspect of the invention, in the recording apparatus according to any one of the second to seventh aspects, the guide arm has, at its base end, an engaging portion to be engaged with the guide portion and a retaining portion for preventing the engaging portion from coming off the guide portion when the tray is moved to the set position.

According to this embodiment, the retaining portion for preventing the engaging portion provided on the guide arm from coming off the guide portion when the holding tray is moved from the stored position to the set position and stopped. Thus, even if unexpected external force is applied to the holding tray or the guide arm, the guide arm does not come off the guide portion. As a result, the holding tray does not come off the recording apparatus.

According to a ninth aspect of the invention, in the recording apparatus according to any one of the first to sixth aspect, when the holding tray moves between the recording start position and the recording termination position, the holding tray receives transportation force from the transporting mechanism.

According to this embodiment, the transporting mechanism directly applies transportation force to the holding tray in the area between the recording start position to the recording termination position, where recording is performed on the recording surface of the recording material. Thus, the orientation of the recording material during transportation is stabilized, and smooth transportation of the recording material is achieved.

BRIEF DESCRIPTION OF THE DRAWINGS

The invention will be described with reference to the accompanying drawings, wherein like numbers reference like elements.

FIG. 3 is a side sectional view of the ink jet printer when recording is started.

FIG. 17 is a plan view of another embodiment, in which the structure of the extendable moving mechanism is changed.

FIGS. 18A and 18B are side views of another embodiment when the tray is stored and when the hard recording material is set, respectively.

DESCRIPTION OF EXEMPLARY EMBODIMENTS

A recording apparatus including a recording-medium transportation unit of the invention will be described below. First, an outline of the overall structure of an ink jet printer 1 as a preferable embodiment of the recording apparatus of the invention will be described with reference to the drawings.

Figure 1:
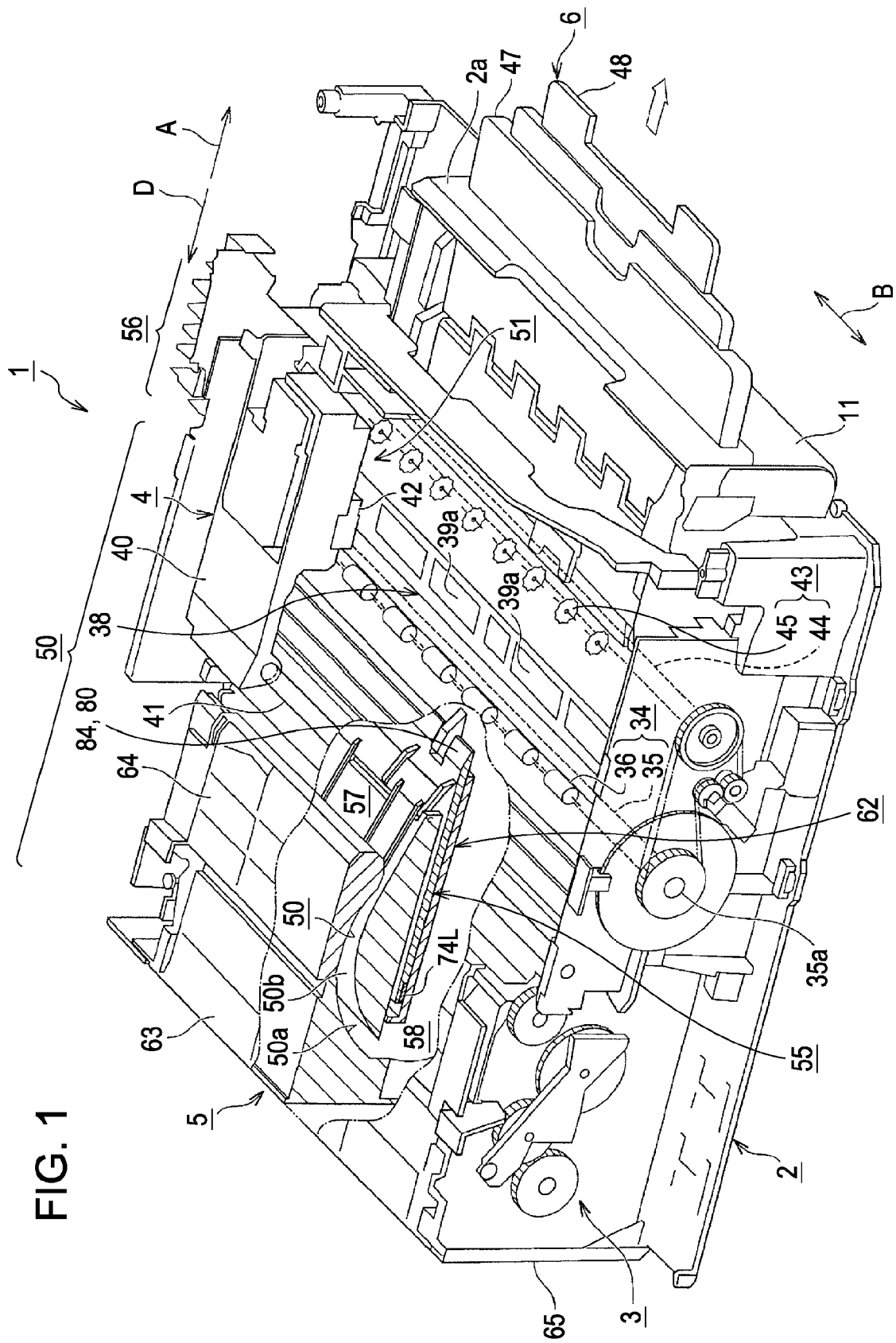
FIG. 1 is a perspective view showing the internal structure of an ink jet printer according to this embodiment.
Figure 2:
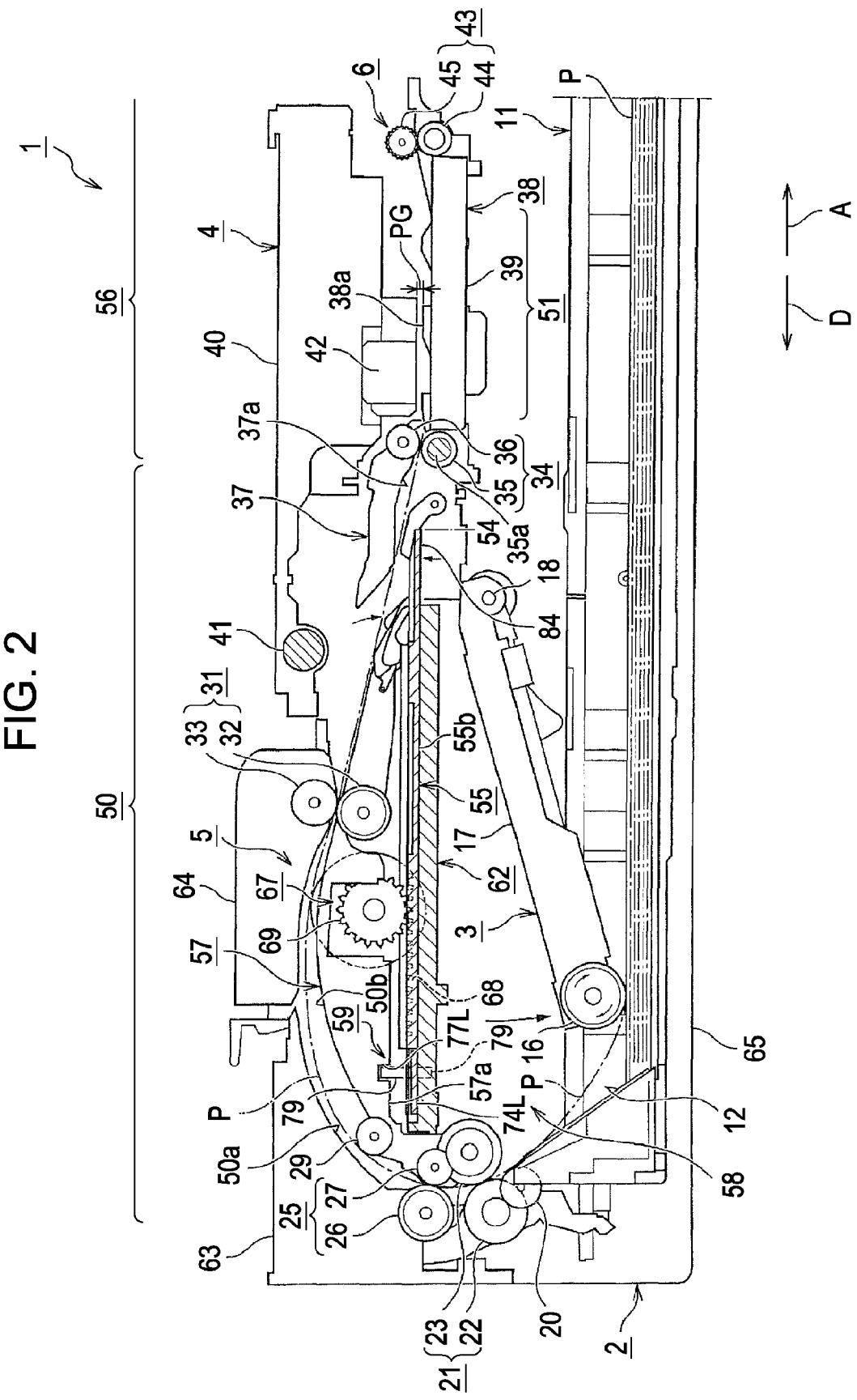
FIG. 2 is a side sectional view of the ink jet printer when a tray is stored.
Figure 3:
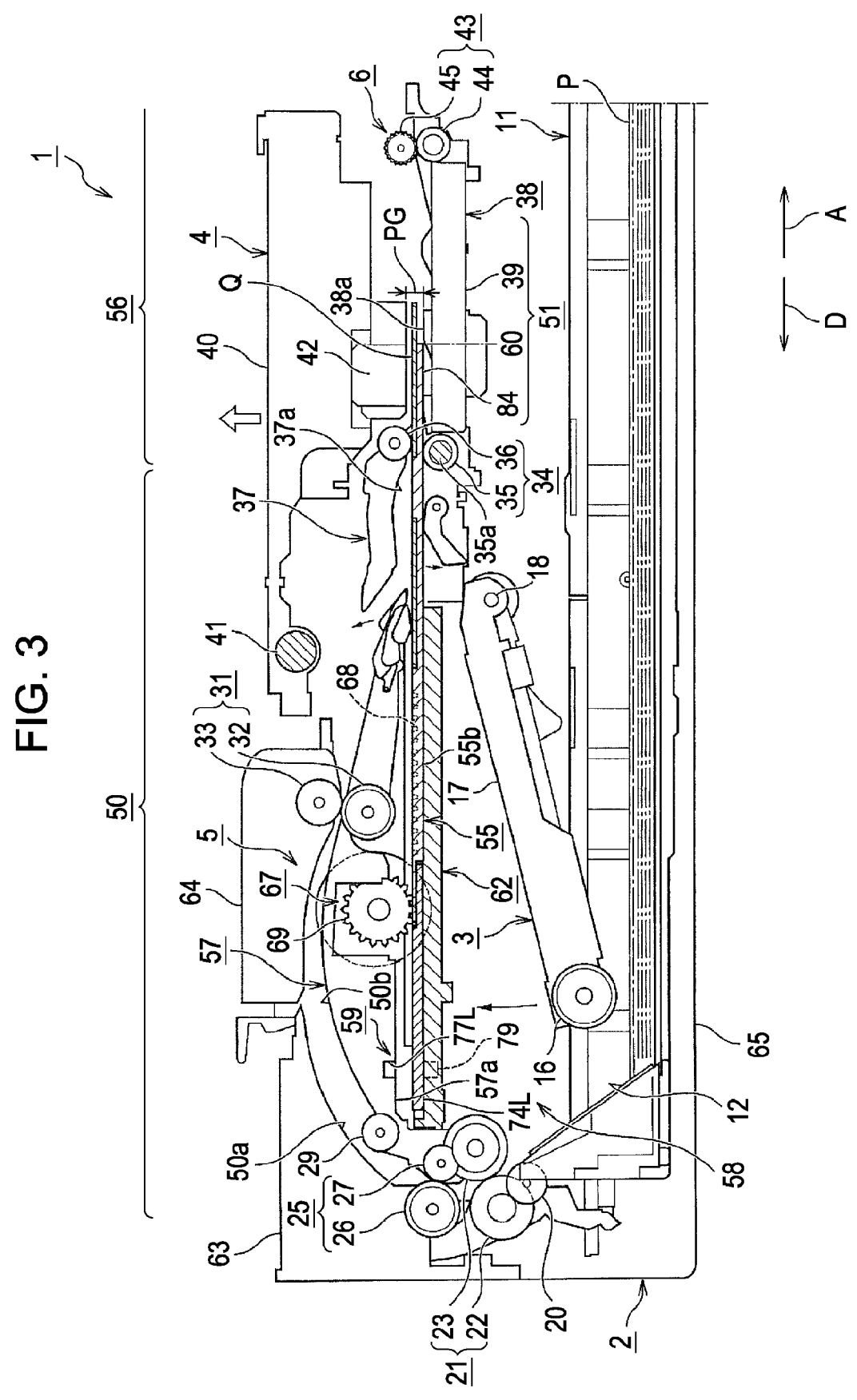
Figure 4:
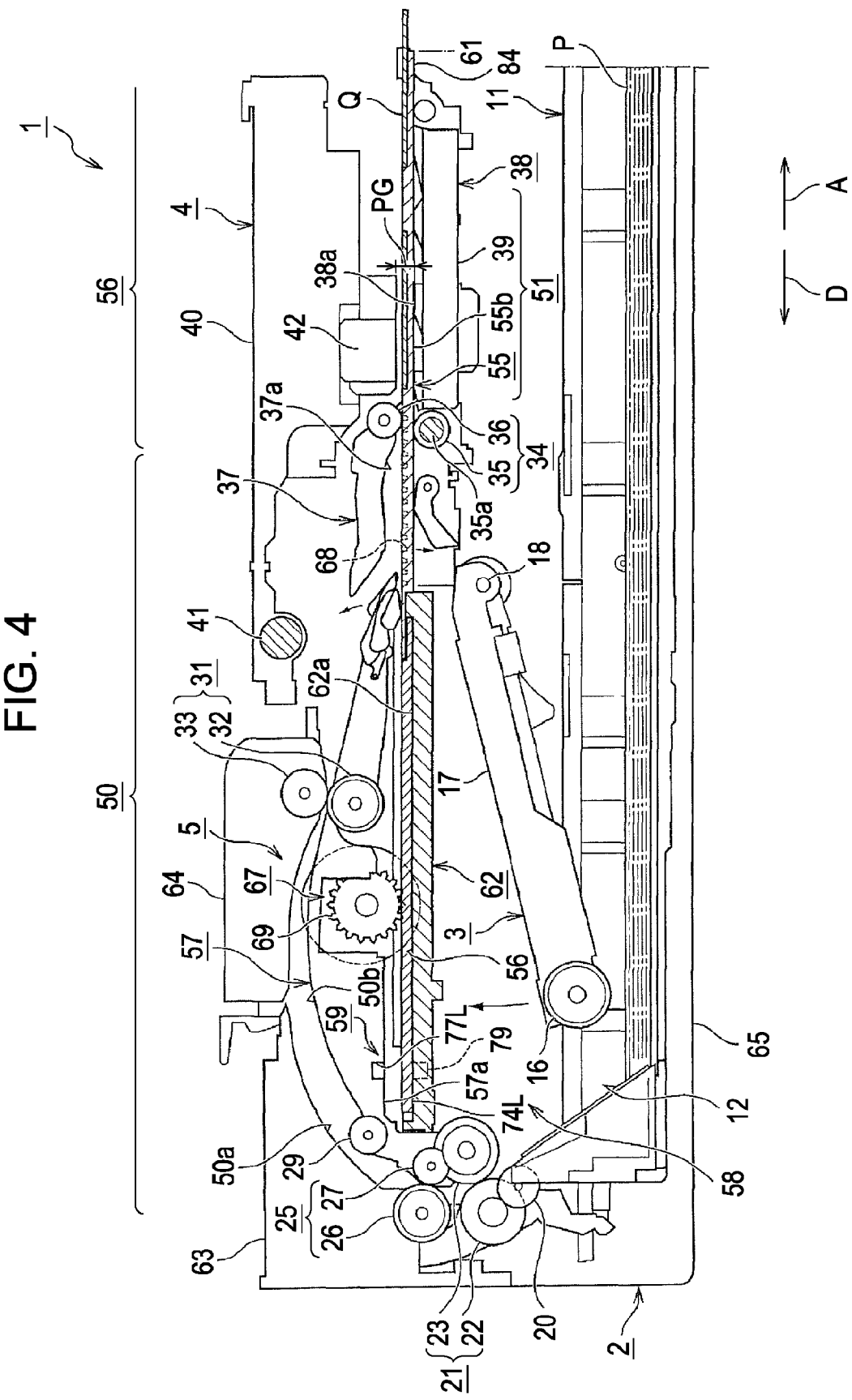
FIG. 4 is a side sectional view of the ink jet printer when the tray is located at a recording termination position.
Figure 5:
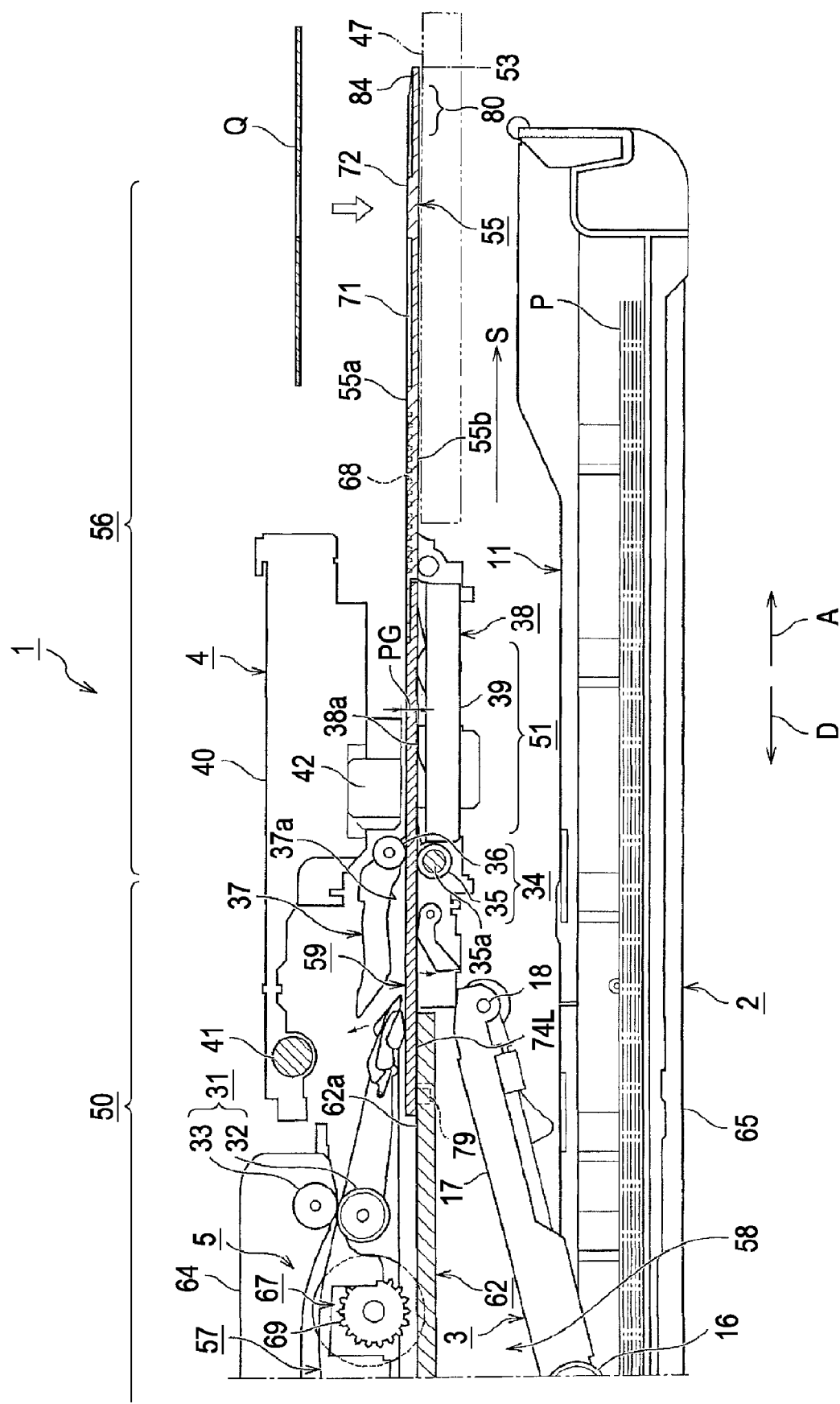
FIG. 5 is a side sectional view of the ink jet printer when a hard recording material is set.

FIG. 1 is a perspective view showing the internal structure of an ink jet printer, and FIG. 2 is a side sectional view showing the schematic internal structure of the ink jet printer when a tray is located at a stored position. FIG. 3 is a side sectional view of the ink jet printer when the tray is located at a recording start position, and FIG. 4 is a side sectional view of the ink jet printer when the tray is located at a recording termination position. FIG. 5 is a side sectional view of the ink jet printer when the tray is located at a set position.

The ink jet printer 1 illustrated in the drawings is a multi-function ink jet printer having an image-reading apparatus (scanner, not shown) mounted thereon. The ink jet printer 1 can perform recording on both soft recording materials P, such as sheets or films, and hard recording materials Q, such as optical discs including CD-Rs and DVD-Rs. In addition, the ink jet printer 1 is a serial printer having a recording head 42 on the bottom surface of a carriage 40 that can reciprocate in a width direction B perpendicular to a conveying direction A in the recording execution area of the above-mentioned two types of media, namely, the soft recording materials P and the hard recording materials Q.

The ink jet printer 1 includes a rectangular-parallelepiped-shaped printer main body 2, serving as a main body of the recording apparatus, with an exterior consisting of relatively flat surfaces. The printer main body 2 has a feeding cassette 11 that can store multiple soft recording materials P such as normal sheets in a stacked state and that is removably fitted to a lower central portion of a front surface 2a. A discharging stacker 47, on which the soft recording materials P after recording are stacked, is provided above the surface to which the feeding cassette 11 is fitted. In addition, the front surface 2a of the printer main body 2 has operation buttons (not shown) for executing various operation instructions, a cartridge holder (not shown) for accommodating ink cartridges, etc.

The feeding cassette 11 is provided at a start position of a transportation path of the soft recording materials P. The soft recording materials P stored in the feeding cassette 11 are fed on a piece-by-piece basis from the top by an auto feeder 3 to a U-shaped reversing path 50 described below. The auto feeder 3 includes a pick-up roller 16 that draws upper soft recording materials P in the feeding cassette 11 backwards, a separating slope 12 that preliminarily separates these upper soft recording materials P and guides them to the U-shaped reversing path 50, a first guide roller 20 provided so as to be freely rotatable at a position diagonally behind and above the separating slope 12, and separating rollers 21 provided at a position diagonally behind and above the first guide roller 20.

The pick-up roller 16 is provided at an end of a swing arm 17 that swings about a swing shaft 18. The pick-up roller 16 is pressed against the top surface of the soft recording material P and is rotated in the conveying direction A during feeding. Thus, the upper soft recording materials P in the feeding cassette 11 can be drawn backwards. The separating rollers 21 include a pair of nip rollers, namely, a separating driven roller 22 provided with a torque limiter and a separating driving roller 23. The separating rollers 21 perform main separation to completely separate the uppermost soft recording material P from the subsequent soft recording materials P that cannot be separated in the preliminary separation by the separating slope 12.

The soft recording material P fed by the auto feeder 3 is transported in the U-shaped reversing path 50 to a recording position 51. Below the recording position 51 is provided a platen 38 that supports the bottom surface of the transported soft recording material P or the tray (holding the hard recording material Q) and that defines a gap PG between itself and the bottom surface of the recording head 42. The platen 38 includes a transportation guide portion 39 serving as a support member, a platen rib 38a formed on the top surface of the transportation guide portion 39, and an ink collecting groove 39a for collecting excess ink not used in recording.

Above the recording position 51 are provided the recording head 42 serving as a main component of the recording execution unit 4 and a carriage 40 that has the recording head 42 on the bottom surface thereof and can reciprocate in the width direction B so as to be guided by a carriage guide shaft 41. Furthermore, the recording execution unit 4 includes a plurality of ink tubes and ink supply pumps (not shown) for supplying ink of different colors to the recording head 42, a capping device (not shown) provided at a home position of the carriage 40, and an auto gap-adjusting mechanism (not shown) that is used when the soft recording material P and the hard recording material Q are switched.

A recording-material discharge unit 6 is provided downstream of the recording position 51 in the conveying direction A. The recording-material discharge unit 6 includes discharge rollers 43 consisting of a pair of nip rollers, namely, a discharging driving roller 44 and a discharging driven roller 45, and the discharging stacker 47. The discharging stacker 47 has an extendable stacker 48 nested therein.

First Embodiment

A recording apparatus having the recording-medium transportation unit 5 according to this embodiment, which is applied to the ink jet printer 1 having the above-described structure, will be described in detail with reference to the drawings.

Figure 6:
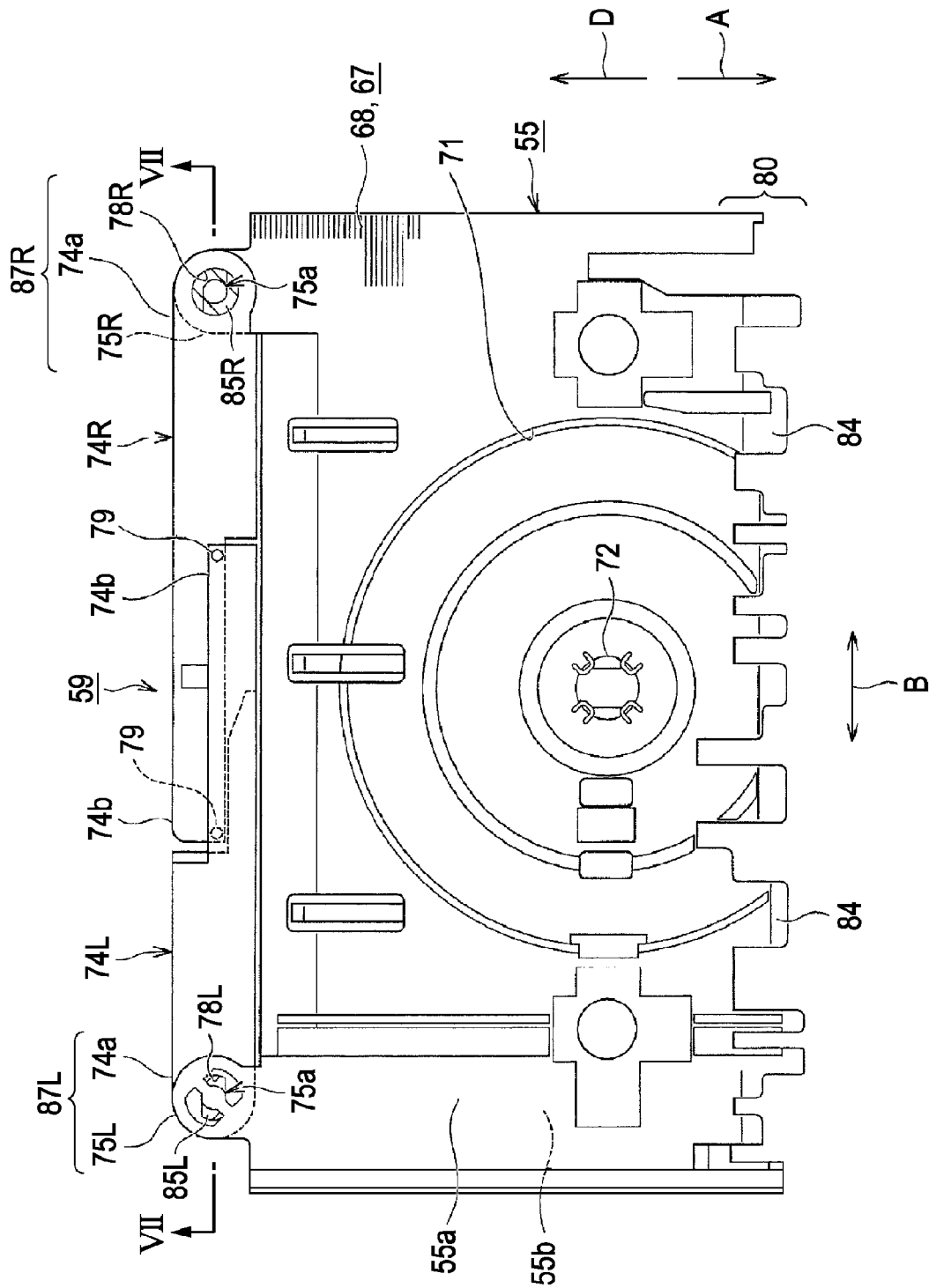
FIG. 6 is a plan view of an extendable moving mechanism when the tray is stored.
Figure 7:
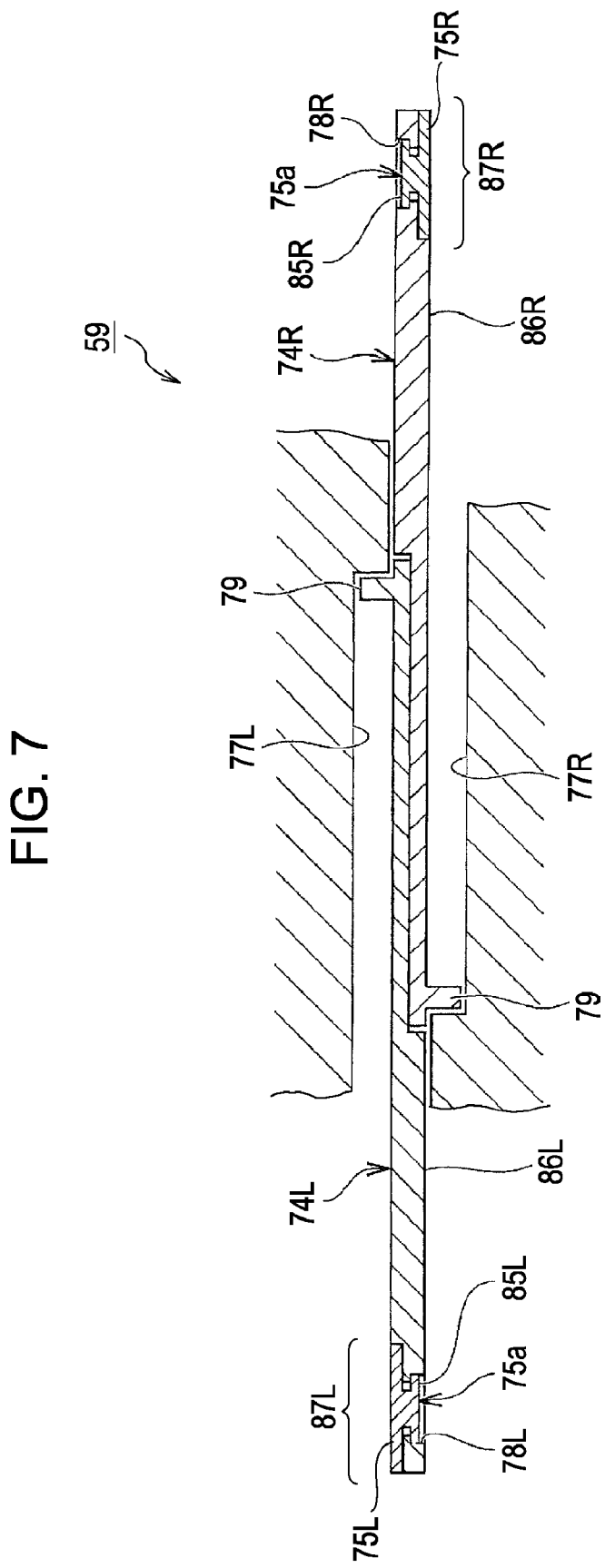
FIG. 7 is a sectional view taken along line VII-VII in FIG. 6.
Figure 8:
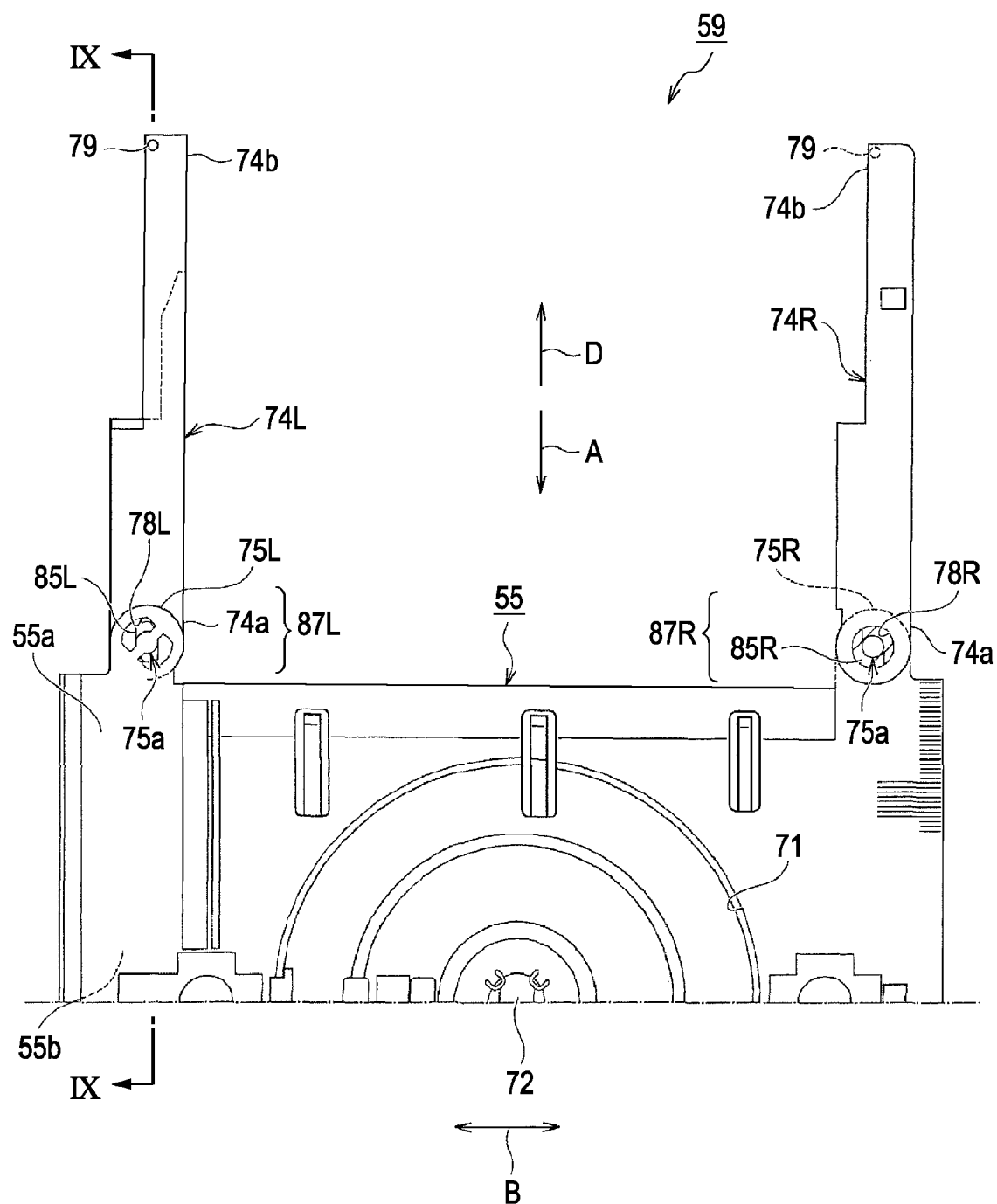
FIG. 8 is a plan view of the extendable moving mechanism when the hard recording material is set.
Figure 9:
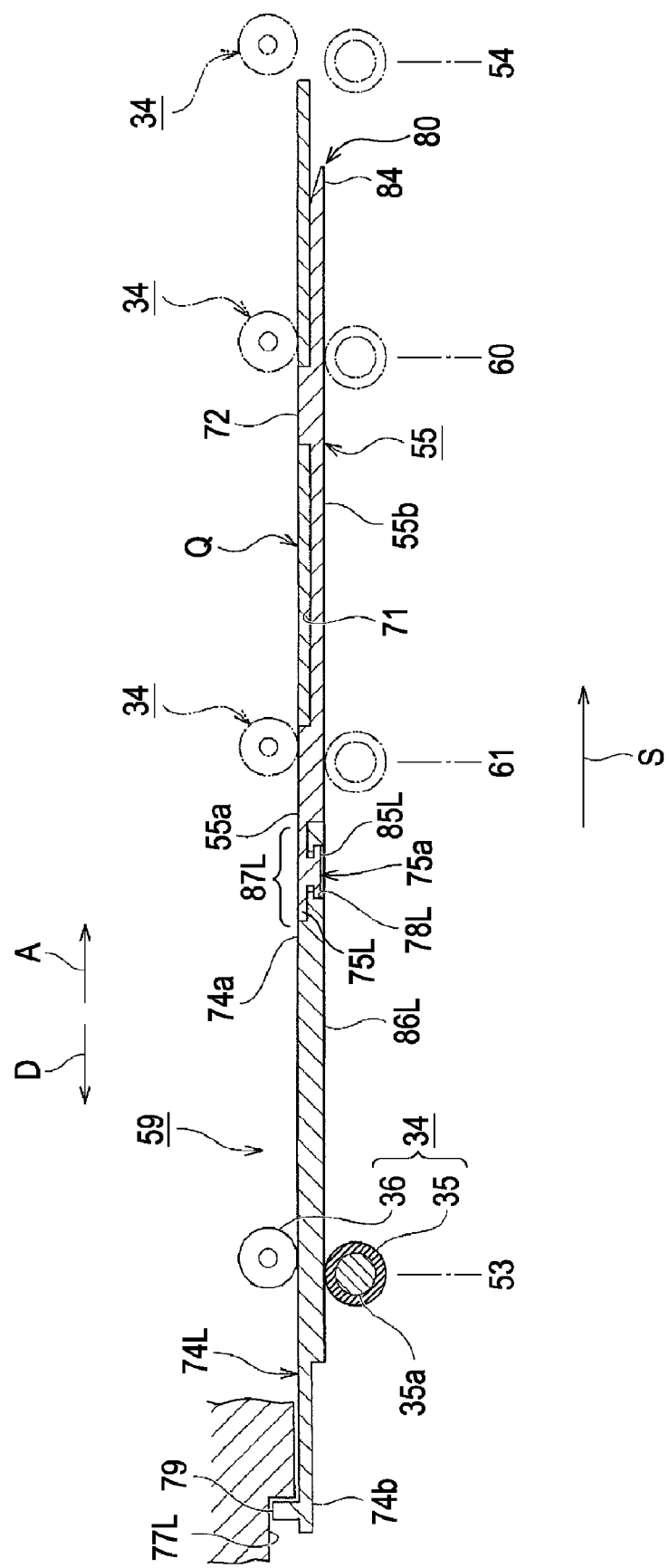
FIG. 9 is a sectional view taken along line IX-IX in FIG. 8, showing a plurality of positions of the tray.
Figure 10:
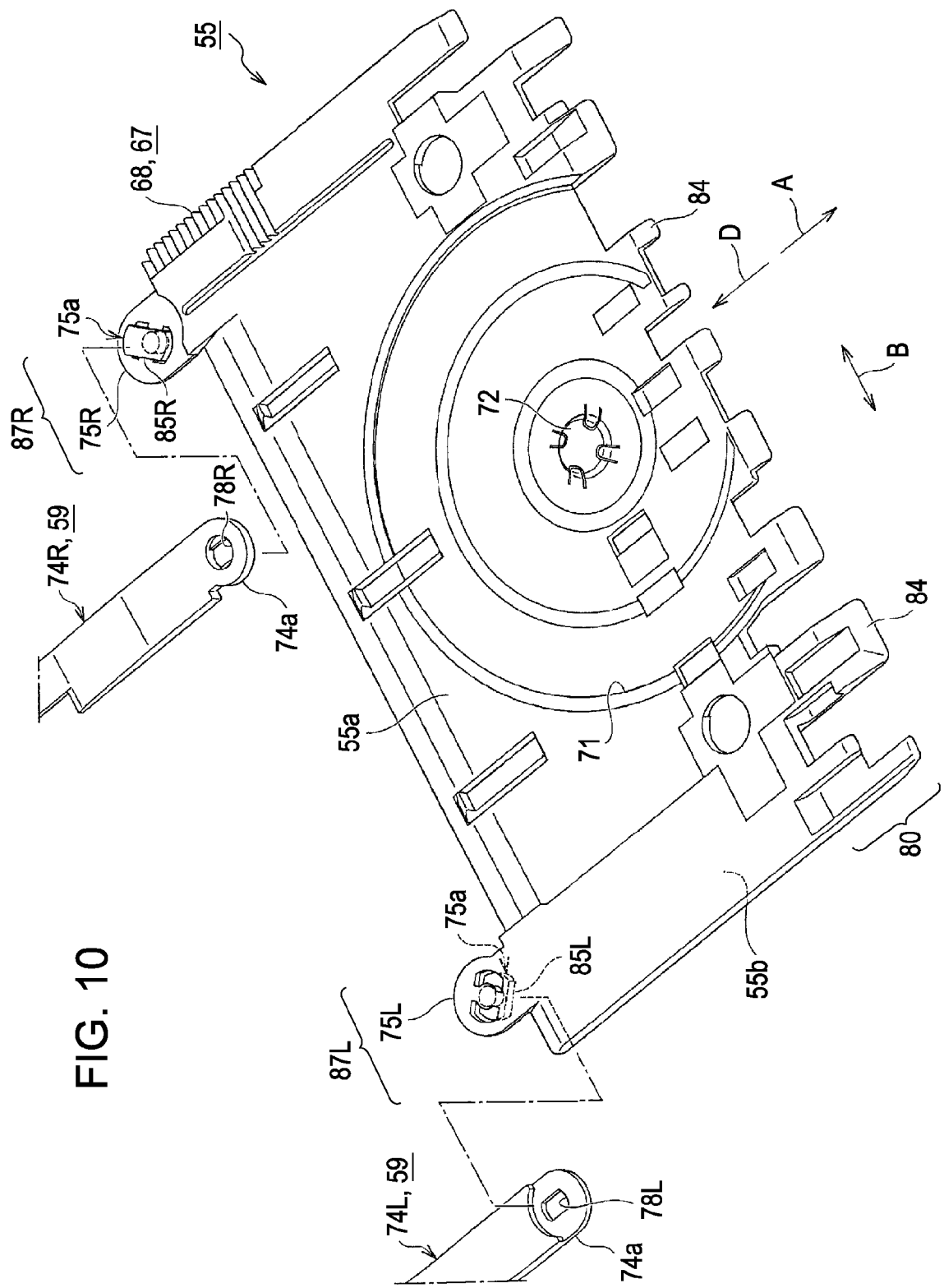
FIG. 10 is an exploded perspective view showing connection structures of the tray and arms.
Figure 11:
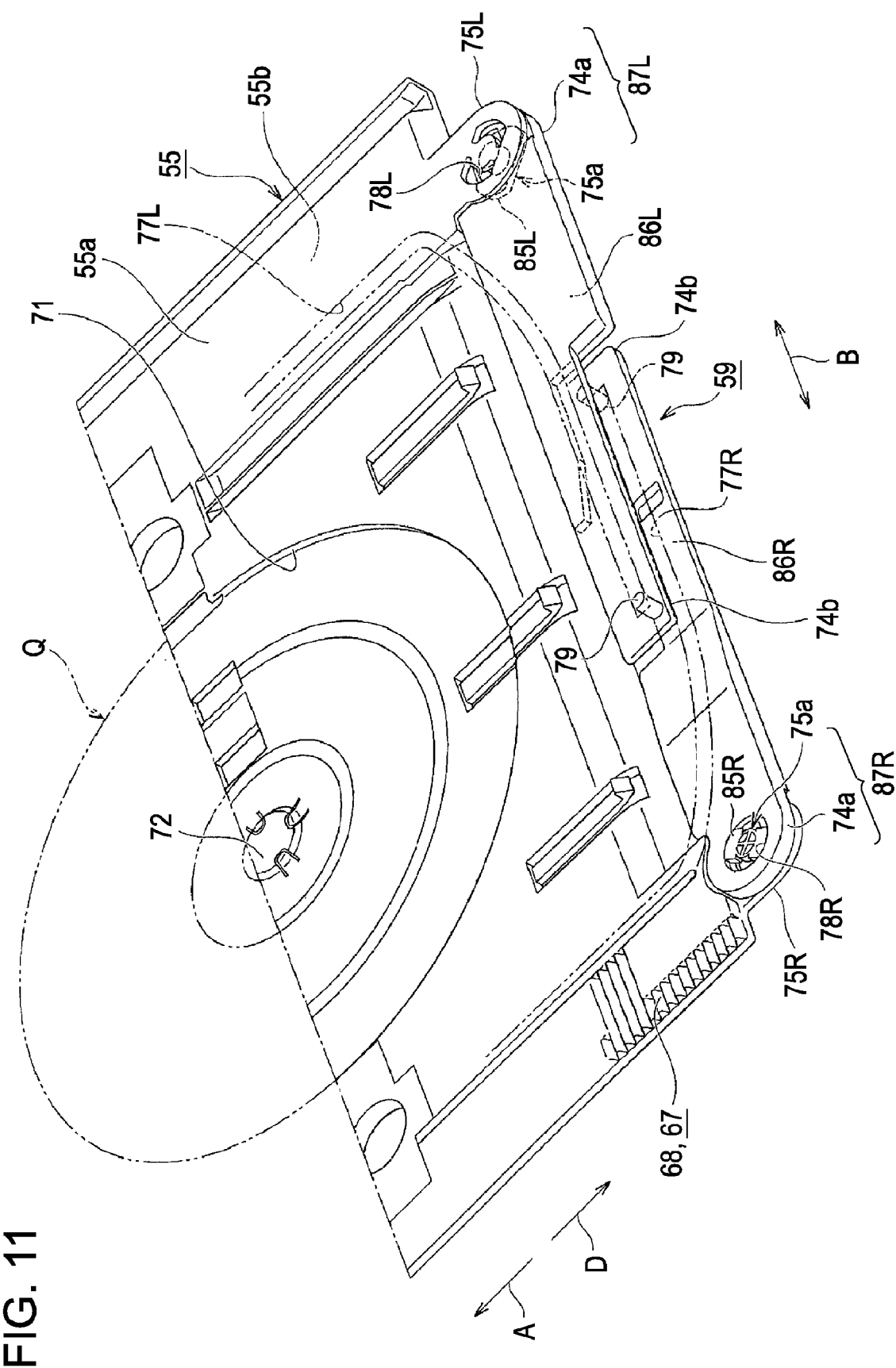
FIG. 11 is a perspective view of the extendable moving mechanism when the tray is stored.
Figure 12:
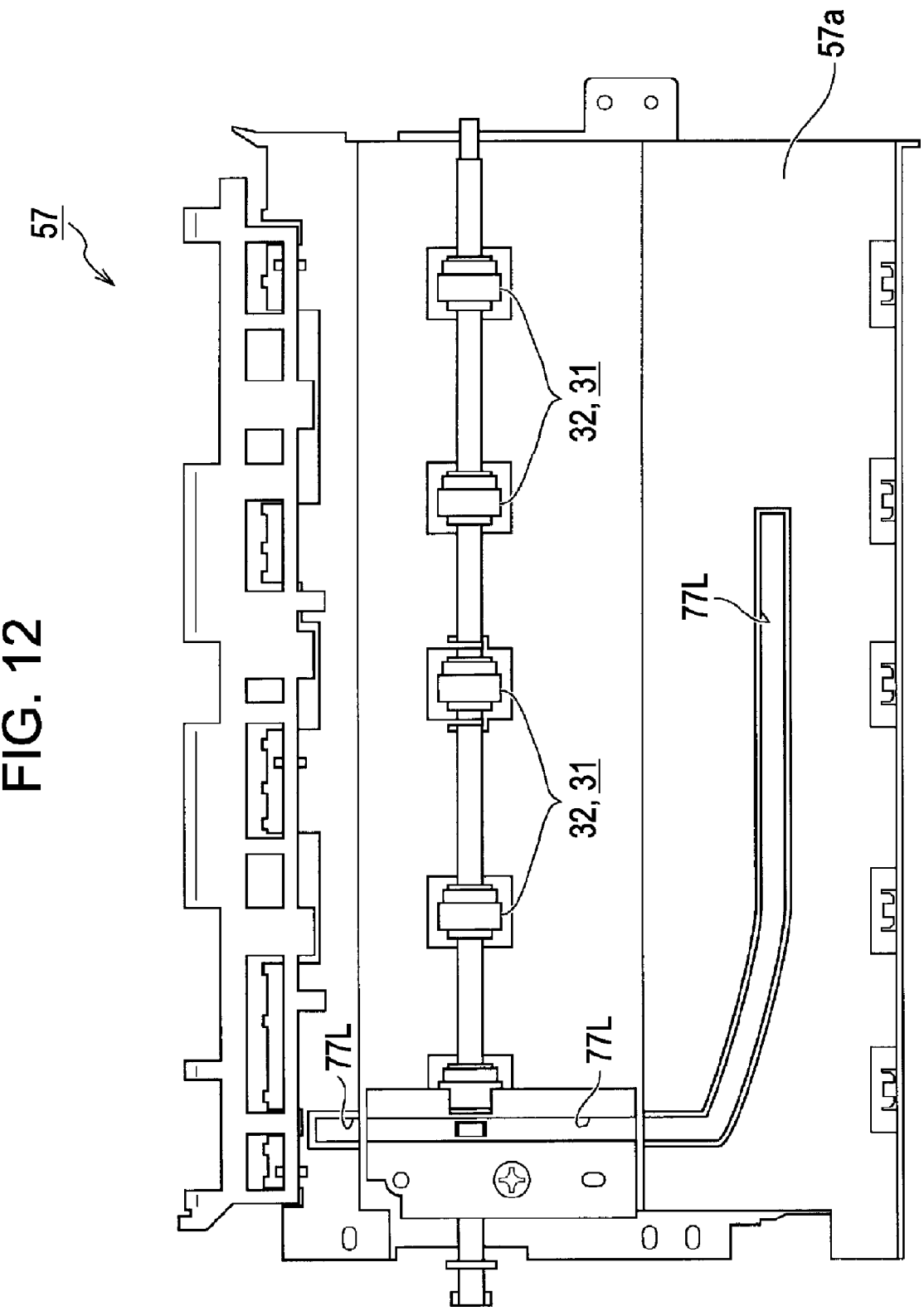
FIG. 12 is a bottom view of an upper-path forming member.

FIG. 6 is a plan view of the extendable moving mechanism when the tray is located at the stored position. FIG. 7 is a sectional view taken along line VII-VII in FIG. 6. FIG. 8 is a plan view of the extendable moving mechanism when the tray is located at the set position. FIG. 9 is a sectional view taken along line IX-IX in FIG. 8, showing a plurality of positions of the tray. FIG. 10 is an exploded perspective view of the tray and arms. FIG. 11 is a perspective view when the tray is located at the stored position, viewed from diagonally above and behind. FIG. 12 is a bottom view of the upper-path forming member.

Figure 13:
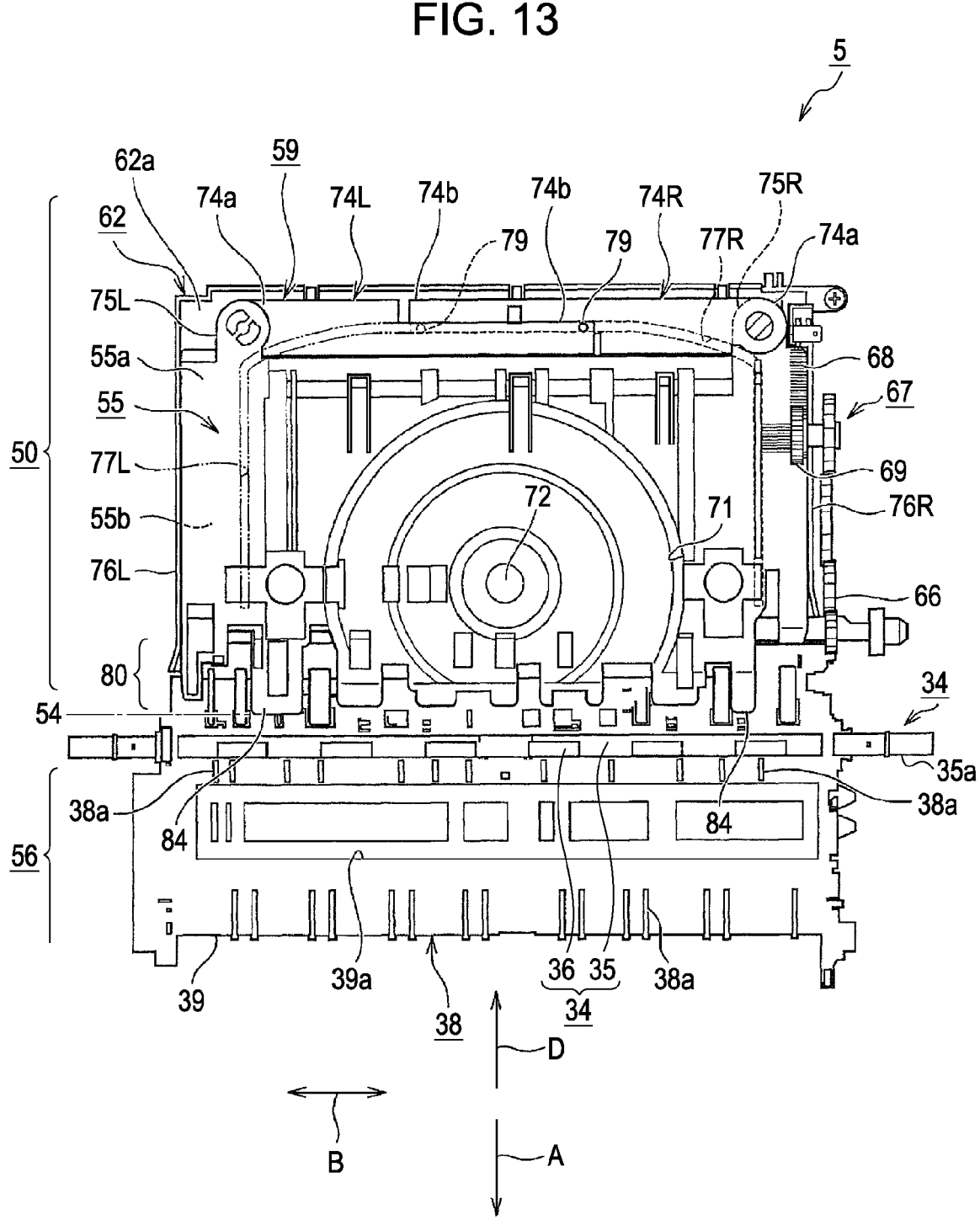
FIG. 13 is a plan view of a recording-medium transportation unit when the tray is stored.
Figure 14:
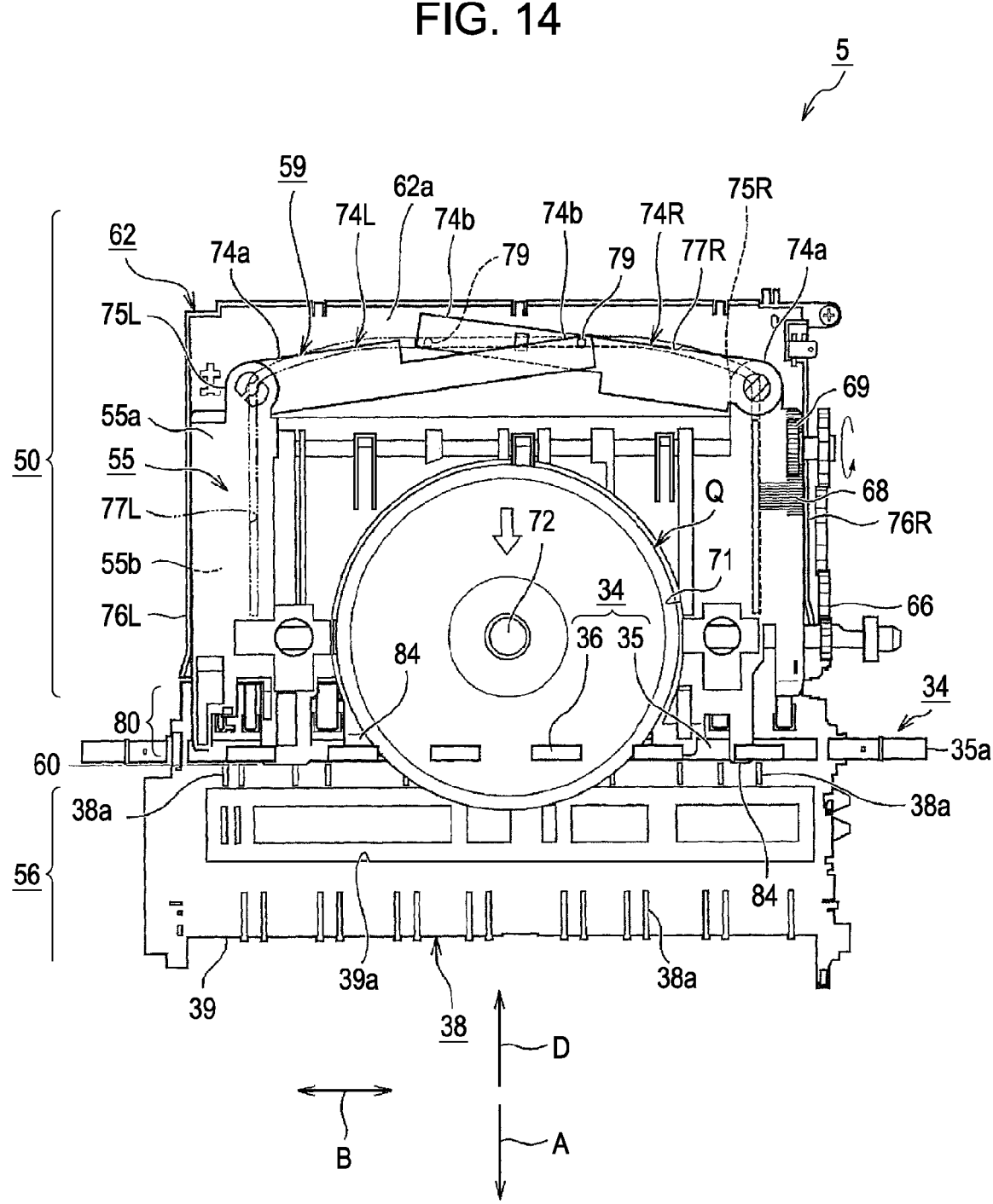
FIG. 14 is a plan view of the ink jet printer when recording is started.
Figure 15:
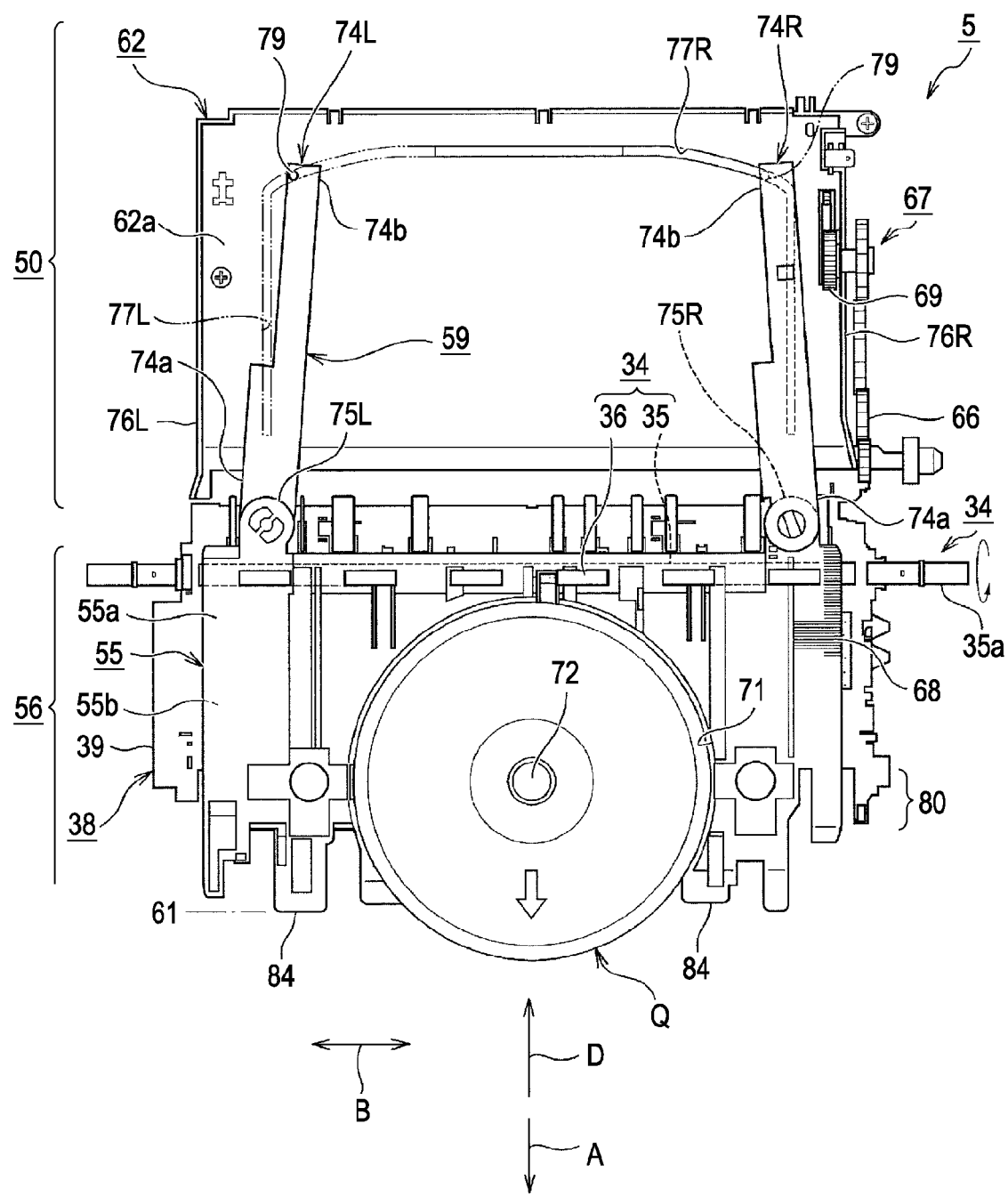
FIG. 15 is a plan view of the ink jet printer when the tray is located at a recording termination position.
Figure 16:
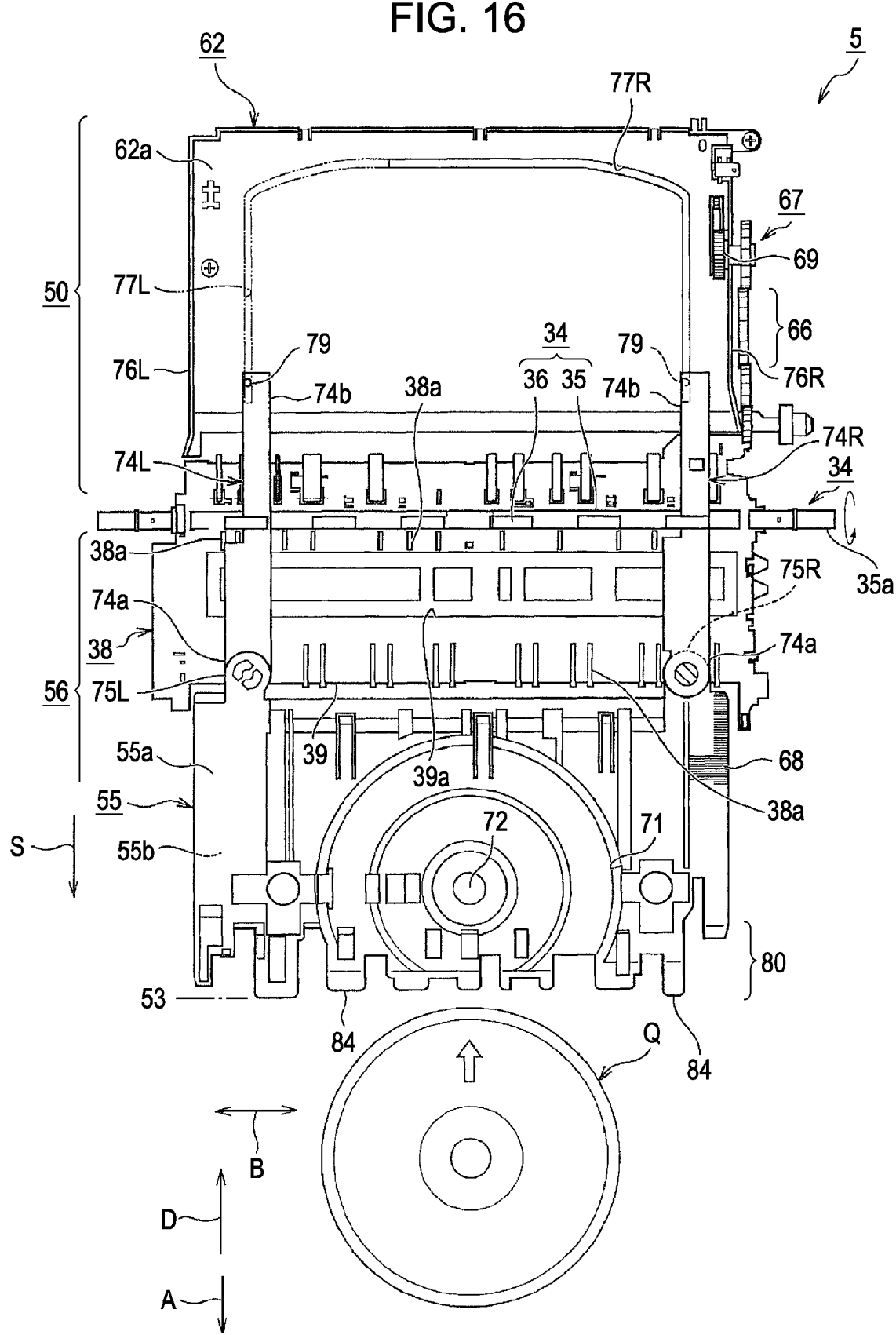
FIG. 16 is a plan view of the ink jet printer when the hard recording material is set.

FIG. 13 is a plan view showing the operation of the tray and the extendable moving mechanism, when the tray is located at the stored position. FIG. 14 is a plan view when the tray is located at a recording start position. FIG. 15 is a plan view when the tray is located at a recording termination position. FIG. 16 is a plan view when the tray is located at the set position.

The recording-medium transportation unit 5 according to this embodiment basically includes: a short tray 55 accommodated in the printer main body 2, in which a hard recording material Q, such as a CD-R, is to be set; a reciprocation path 56 that guides the tray 55 reciprocating between the set position 53 and the stored position 54; transportation rollers 34, serving as a transporting mechanism, which are provided in the middle of the reciprocation path 56 and consist of a transportation driving roller 35 and a transportation driven roller 36 for applying transportation force to the tray 55; and an extendable moving mechanism 59 that is connected to the rear end of the tray 55 and has an extension function with a movement stroke S that enables the movement of the tray 55 between the set position 53 and the stored position 54.

In addition to the above-described structures, the recording-medium transportation unit 5 according to this embodiment includes: the feeding cassette 11 that can store multiple soft recording materials P, such as normal sheets, in a stacked state; the U-shaped reversing path 50 that feeds the soft recording material P backwards from the feeding cassette 11, causes it to make a U-turn, and guides it toward the front surface 2a of the printer main body 2; and an auxiliary transportation mechanism 67 that performs auxiliary transportation until the tray 55 is transferred to the transportation rollers 34.

Herein, the term "the recording position 51" refers to a recording execution area in which the recording head 42 performs recording on a recording material. In FIGS. 3 and 14, reference numeral 60 denotes a front end position of the tray 55 when the recording on the hard recording material Q is started. This position will be referred to as a recording start position 60 of the tray 55. Corresponding to the recording start position 60, the front end position of the tray 55 when the recording on the hard recording material Q is terminated constitutes the recording termination position of the tray 55. In FIGS. 4 and 15, reference numeral 61 denotes the front end position of the tray 55 at the recording termination position.

First, the U-shaped reversing path 50 constituting the transportation path for the soft recording material P will be described. The U-shaped reversing path 50 is provided in a rear space of the printer main body 2. The U-shaped reversing path 50 is formed of, for example, two separate upper housings 63 and 64, a transportation guide 37, and a lower housing 65, which constitute an outer guide surface 50a of the U-shaped reversing path 50; and the upper-path forming member 57, which constitutes an inner guide surface 50b of the U-shaped reversing path 50.

As shown in FIGS. 2 to 4, the U-shaped reversing path 50 includes: first intermediate feeding rollers 25 consisting of a pair of nip rollers, namely, a feeding driving roller 26 and a feeding driven roller 27; a freely rotatable second guide roller 29; and second intermediate feeding rollers 31 consisting of a pair of nip rollers, namely, a feeding driving roller 32 and a feeding driven roller 33. Because of the feeding and guiding operations of the first intermediate feeding rollers 25, the second guide roller 29, and the second intermediate feeding rollers 31, the soft recording material P fed to the U-shaped reversing path 50 passes through the U-shaped reversing path 50 and is fed to the nip point of the transportation rollers 34 provided near the downstream of the U-shaped reversing path 50.

The transportation rollers 34 consist of a pair of nip rollers, namely, the transportation driving roller 35 supported by a roller driving shaft 35a and the transportation driven roller 36 provided so as to be freely rotatable at an end of the transportation guide 37. The transportation driven roller 36 is located slightly downstream of the transportation driving roller 35 in the conveying direction A. By using the transportation rollers 34 consisting of the rollers arranged in this manner, the front end of the soft recording material P is pressed against the underlying platen rib 38a and is thereby prevented from touching the head. Thus, the recording quality is improved.

The roller driving shaft 35a receives motive power transmitted from a driving motor (not shown) to transport the soft recording material P and the tray 55 (hard recording material Q) and transmits the motive power via the gear train 66 to the auxiliary transportation mechanism 67 to perform movement starting operation to move the tray 55 from the stored position 54 and movement terminating operation to return the tray 55 to the stored position 54.

In addition, the roller driving shaft 35a has a clutch device (not shown). By appropriately changing the engaging position of the clutch device, motive power of the roller driving shaft 35a can be selectively transmitted to the above-mentioned ink supply pumps (not shown), capping device, auto gap-adjusting mechanism, and auto feeder 3.

The tray 55 is formed so as to be shorter than the entire moving distance over which it reciprocates. That is, the tray 55 is, as shown in FIG. 10, a short rectangular plate-like member having a small depth. A setting recess 71 in which the hard recording material Q is to be set is provided in the top surface 55a of the tray 55, at the center in the width direction and slightly frontward, and a holding projection 72 for holding the hard recording material Q, provided at the center of the setting recess 71. The hard recording materials Q that can be set in the tray 55 include various optical discs, such as CD-Rs, CD-RWs, DVD-Rs, DVD-RWs, blu-ray discs, which draw attention as a next-generation optical disc, and other discs to be developed, with a diameter of either 12 cm or 8 cm.

As shown in FIG. 10, a front end portion 80 of the tray 55 is formed in a comb-like zigzag shape, and projected portions thereof constitute guide nails 84 that are sloped toward the front edge. The tray 55, near the left and right rear corners, has tongue-like connecting pieces 75L and 75R that are connected respectively to tips 74a and 74a of left and right arms 74L and 74R of the extendable moving mechanism 59 (described below) so as to be rotatable. The bottom surface of the connecting piece 75L on the left side and the top surface of the connecting piece 75R on the right side are provided with mushroom-shaped connecting projections 75a each having an engaging flange portion 85 at the tip. The connecting projections 75a will be engaged with left and right connecting holes 78L and 78R (described below).

The reciprocation path 56 includes the lower-path forming member 62 that supports the bottom surface 55b of the tray 55 when the tray 55 is located at the stored position 54, left and right edge guides 76L and 76R for guiding the tray 55, along which the left and right edges of the tray 55 slide, the transportation guide portion 39 that faces the bottom surface 55b of the tray 55 when the tray 55 is located at the recording position 51, and the discharging stacker 47 that supports the bottom surface 55b of the tray 55 when the tray 55 is located at the set position 53.

The lower-path forming member 62 is a short plate-like member having substantially the same size as the tray 55. The left and right edge guides 76L and 76R are provided so as to extend upright from the left and right side edges of the lower-path forming member 62. As shown in FIGS. 10 and 15, the lower-path forming member 62 has a guide rail 77R engraved therein, having an L shape in plan view and serving as a guide portion, which is to be engaged with the guide pin 79 provided at the base end 74b of the right arm 74R of the extendable moving mechanism 59 described below.

The extendable moving mechanism 59 includes the pair of left and right arms 74L and 74R connected to the rear edge of the tray 55 so as to be rotatable, and the guide rails 77L and 77R that serve as the left and right guide portions and engage with guide pins 79 and 79 provided at base ends 74b and 74b (FIG. 9) of the arms 74L and 74R to guide the orientation and movement of the arms 74L and 74R.

The arms 74L and 74R are narrow, long plate-like members with rounded tips 74a and 74a. The arms 74L and 74R are each formed such that the tip 74a and the base end 74b are different in shape, i.e., the tip 74a is wide and thick and the base end 74b is narrow and thin. By overlaying the thin portions of the left and right arms 74L and 74R on top of each other, the left and right arms 74L and 74R can be stored in a compact, folded state without increasing the thickness or causing interference with each other. In this embodiment, the left arm 74L is positioned above the right arm 74R at the position where the left and right arms 74L and 74R overlie each other.

The tip 74a of the left arm 74L has a stepped shape in which the top surface is lowered, and has, at the center thereof, an elongated connecting hole 78 that receives the downwardly projecting connecting projection 75a of the connecting piece 75L provided at the rear edge, on the left side, of the tray 55. On the other hand, the tip 74a of the right arm 74R has a stepped shape in which the bottom surface is lowered, and has, at the center thereof, an elongated connecting hole 78R that receives the upwardly projecting connecting projection 75a of the connecting piece 75R provided at the rear edge, on the right side, of the tray 55. The connecting projections 75a and 75a are formed so as not to project from the corresponding connecting holes 78L and 78R when the connecting pieces 75L and 75R are connected to the tips 74a and 74a of the arms 74L and 74R, respectively.

Thus, the tray 55 and the pair of left and right arms 74L and 74R are formed to have a substantially uniform thickness in the area where they are to be in contact with the transportation rollers 34. In particular, when the tray 55 moves between the recording termination position and the set position 53, the arms 74L and 74R are held between the transportation rollers 34 so that the transportation force is applied to the tray 55 via the arms 74L and 74R. Thus, in the above-mentioned moving area, contact surfaces 86L and 86R of the arms 74L and 74R on the transportation rollers 34 side are flat surfaces.

There is a slight step due to fabrication error or assembly error at each of the connection portion 87L on the left side (in FIG. 10) of the tray 55, at which the connecting piece 75L and the arm 74L are connected, and the connection portion 87R on the right side of the tray 55, at which the connecting piece 75R and the arm 74R are connected. However, because the positional relationship in the top-bottom direction between the tray 55 and the arm 74L of the left connection portion 87L is opposite to that between the tray 55 and the arm 74R of the right connection portion 87R, these steps at the left and right connection portions 87L and 87R are located at different positions in the conveying direction. Accordingly, when the connection portions 87L and 87R pass through the nip between the transportation rollers 34, the steps at the left and right connection portions 87L and 87R successively pass through the nip between the transportation rollers 34. Thus, the tray 55 is smoothly transported regardless of whether it is transported in the conveying direction A or returning direction D.

The guide rails 77L and 77R, serving as guide portions, are grooves arranged symmetrically and each having an L shape in plan view. The left guide rail 77L is provided in an inner surface 57a of the upper-path forming member 57, and the right guide rail 77R is provided in a top surface 62a of the lower-path forming member 62. The guide pin 79 of the left arm 74L is engaged with the left guide rail 77L so as to be movable, and the guide pin 79 of the right arm 74R is engaged with the right guide rail 77R so as to be movable. Thus, the upper-path forming member 57 serves as a component of the U-shaped reversing path 50, as described above, as well as a component of the reciprocation path 56.

The movement of the tray 55 in the conveying direction A and the returning direction D opposite the conveying direction A is performed not only by the transportation rollers 34 but also by the auxiliary transportation mechanism 67. The auxiliary transportation mechanism 67 moves the tray 55 located at the stored position 54 to the recording start position 60 and returns the tray 55 located at the recording start position 60 to the stored position 54. Examples of the auxiliary transportation mechanism 67 include a rack and pinion mechanism. In this embodiment, as shown in FIG. 13, the auxiliary transportation mechanism 67 includes a rack 68 provided on the top surface 55a of the tray 55, near the right rear corner, and a pinion 69 engaged with the rack 68, provided at the end of the gear train 66 for transmitting motive power of the roller driving shaft 35a.

The operation of the thus-configured recording apparatus according to this embodiment will be described with respect to the following situations:
(1) When the tray is stored (accommodated);
(2) When recording is started;
(3) When recording is terminated; and
(4) When the tray is set.
(1) When the Tray is Stored (Accommodated) (Refer to FIGS. 2, 6, 7, 11, and 13)

When the tray 55 is located at the stored position 54, as shown in the drawings, the left and right arms 74L and 74R overlie one another in a compact form and are stored in the rear space of the lower-path forming member 62. In this state, as shown in FIG. 2, recording can be performed on the soft recording material P. That is, the uppermost one of the soft recording materials P accommodated in the feeding cassette 11 is fed to the U-shaped reversing path 50 by the auto feeder 3.

In the U-shaped reversing path 50, the first intermediate feeding rollers 25 and the second intermediate feeding rollers 31 apply feeding force to the soft recording material P. The soft recording material P is guided to the transportation rollers 34 by the second guide roller 29, the outer guide surface 50a and the inner guide surface 50b of the U-shaped reversing path 50, and the inner guide surface 37a of the transportation guide 37. The transportation rollers 34 hold and transport the soft recording material P to the recording position 51, where the recording execution unit 4 performs recording.
(2) When Recording is Started (Refer to FIGS. 3, 9, and 14)

The tray 55 located at the stored position 54 is first moved to the set position 53 by the auxiliary transportation mechanism 67 and the transportation rollers 34 shown in FIGS. 5 and 16. That is, when the motive power of the roller driving shaft 35a is transmitted to the rack 68 on the top surface 55a of the tray 55 via the gear train 66 and the pinion 69, the tray 55 starts to move forward. Once the front end portion 80 of the tray 55 arrives at the nip point of the transportation rollers 34, the auxiliary transportation mechanism 67 stops transmitting the motive power. Then, the transportation rollers 34 start transmitting the motive power to bring the tray 55 to the set position 53.

When the hard recording material Q is set in the setting recess 71 in the tray 55, the transportation rollers 34 bring the tray 55 back to the recording start position 60 shown in FIGS. 3 and 14. Then, the tray 55 is transported in the conveying direction A by the transportation force of the transportation rollers 34. At the same time, the carriage 40 reciprocating in the width direction B causes ink of different colors to be ejected from the recording head 42 over the entire width of the recording surface of the hard recording material Q from above. Thus, recording is started. The tray 55 is used when the recording is performed on the recording surface of the hard recording material Q. Therefore, before the recording is started, a gap PG between the recording head 42 and the platen 38 is increased upward by an auto gap adjusting device (not shown) to set the gap to the gap PG for the hard recording material Q.
(3) When Recording is Terminated (Refer to FIGS. 4, 9, and 15)

When the tray 55 is transported to the recording termination position, the recording on the recording surface of the hard recording material Q is terminated. At this time, the front end of the tray 55 shown in FIGS. 4 and 15 are located at the recording termination position 61.

When the tray 55 is moved from the recording start position 60 to the recording termination position 61, the transportation rollers 34 directly hold the tray 55 therebetween to apply the transportation force to the tray 55. The accurate, stable, and smooth transportation of the tray 55 improves the recording quality.

(4) When the Tray is Set (Refer to FIGS. 5, 8, 9, and 16)

When the hard recording material Q is to be set in the tray 55 or when the hard recording material Q after recording is to be removed from the tray 55, the tray 55 is located at the set position 53, where it is fully drawn frontward by the amount of movement stroke S, as shown in FIGS. 5, 8, 9, and 16. The tray 55 is moved from the recording termination position 61 to the set position 53 by allowing the left and right arms 74L and 74R to extend in the conveying direction A and by holding the arms 74L and 74R between the transportation rollers 34 to apply the transportation force indirectly to the tray 55.

As described above, in the area in which the tray 55 is moved between the recording termination position 61 and the set position 53, the contact surfaces 86L and 86R of the arms 74L and 74R on the transportation driving roller 35 side are flat. In addition, as described above, the positional relationship in the top-bottom direction between the tray 55 and the arm 74L of the left connection portion 87L is opposite to that between the tray 55 and the arm 74R of the right connection portion 87R. Accordingly, the tray 55 is smoothly transported while maintaining a stable orientation in the above-mentioned area as in the case where it is held between the transportation rollers 34 and receives transportation force directly.

The movement of the tray 55 between the stored position 54 and the set position 53, between the recording start position 60 and the recording termination position 61, and between the recording termination position 61 and the set position 53 causes the guide pins 79 and 79 provided at the base ends 74b and 74b of the left and right arms 74L and 74R to move while being engaged with the guide rails 77L and 77R, respectively. Thus, the orientation of the arms 74L and 74R is continuously changed from the orientation in which they are folded so as to overlie each other, as shown in FIGS. 2, 6, 7, 11, and 13, to the orientation in which they are extended, as shown in FIGS. 5, 8, 9, and 16.

The relationship between the arms 74L, 74R and the guide rails 77L, 77R when the arms 74L and 74R have been moved to the set position 53 will be described.

FIGS. 19 to 22 are partial enlarged views of the arm 74L and the guide rail 77L and diagrams showing the relationship between the arm 74L and the guide rail 77L immediately before the tray 55 moves to the set position 53.

Figure 19:
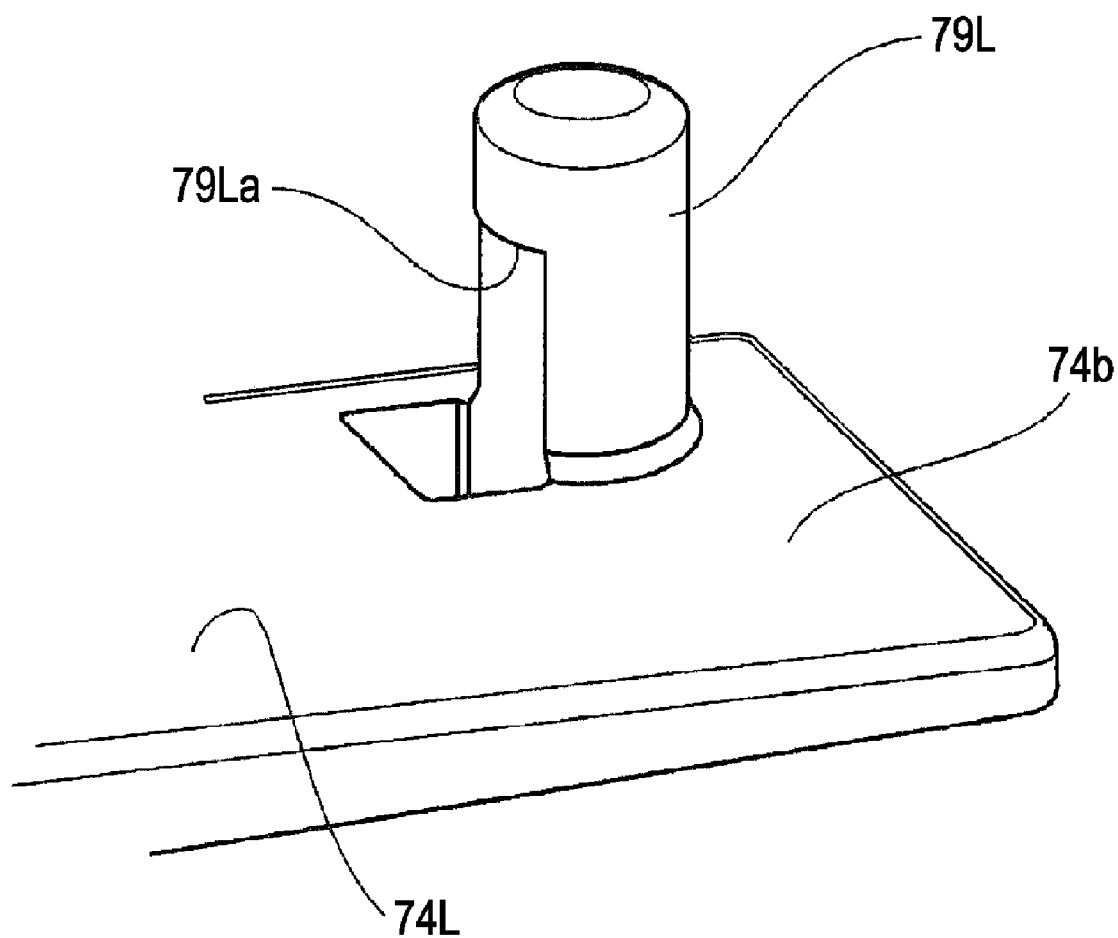
FIG. 19 is an enlarged perspective view of the vicinity of a guide pin, in which a base end of the arm is viewed from diagonally above.
Figure 20:
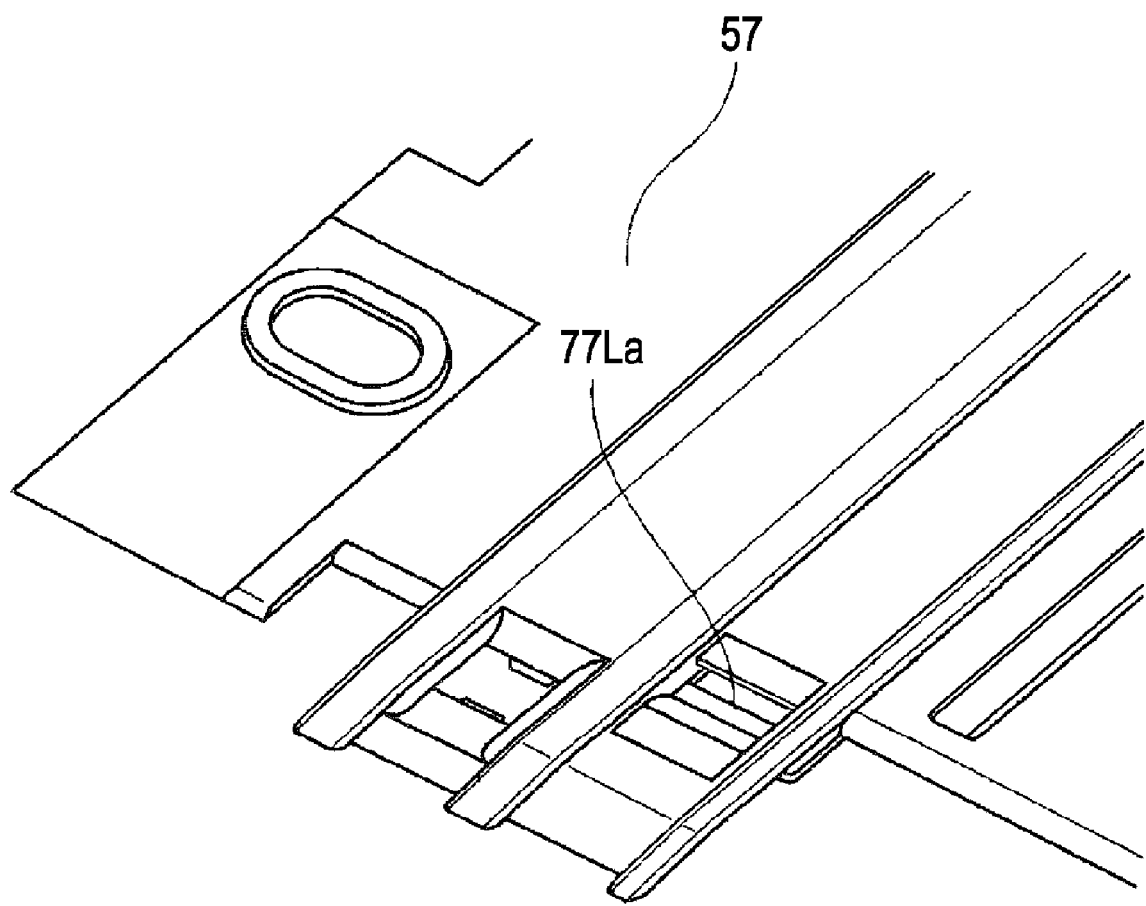
FIG. 20 is a perspective view of the upper-path forming member viewed from diagonally above, in which a part of the tip of a guide rail to be engaged with the guide pin provided on the arm is enlarged.
Figure 21:
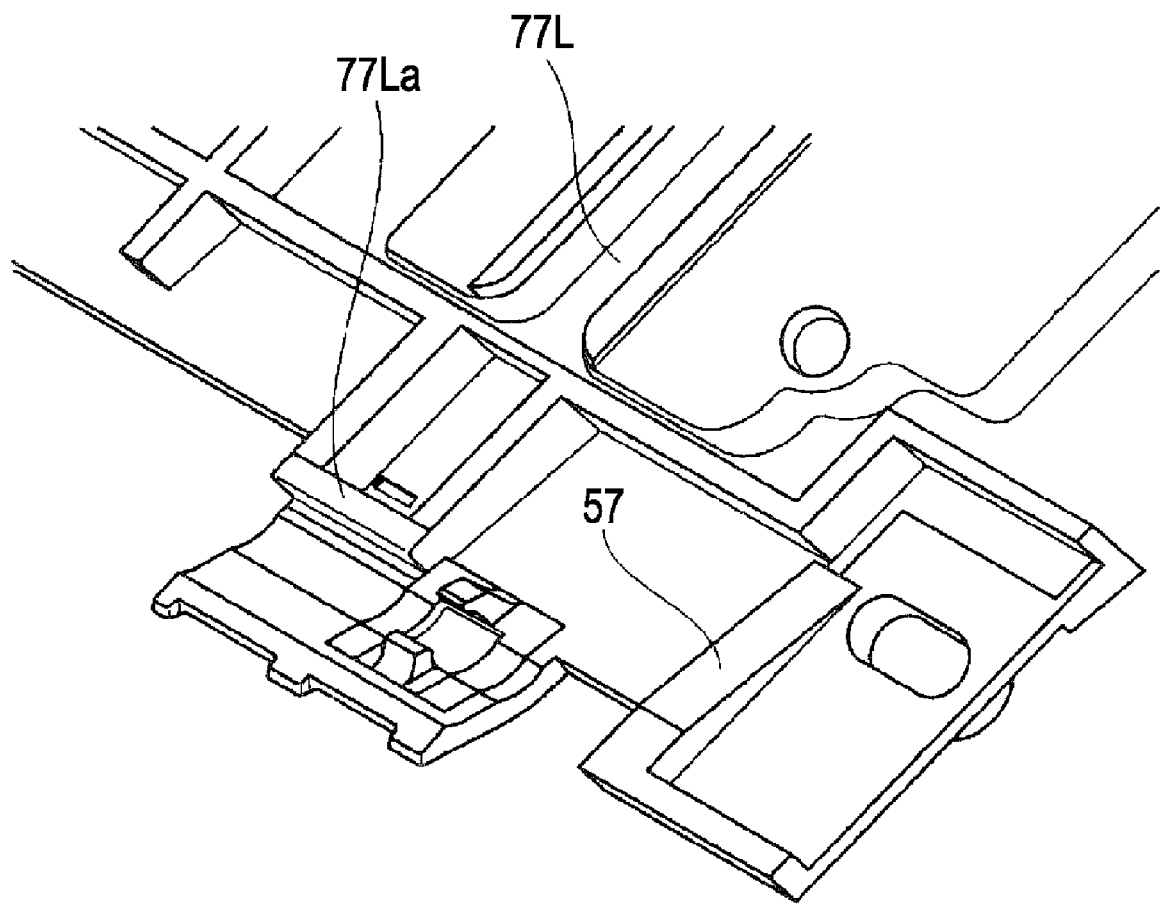
FIG. 21 is a perspective view of the upper-path forming member viewed from diagonally below, in which a part of an end of the guide rail to be engaged with the guide pin provided on the arm is enlarged.

FIG. 19 is an enlarged perspective view of the vicinity of the guide pin 79L in the sate of FIG. 8, in which the base end 74b of the arm 74L is viewed from diagonally above. As shown in FIG. 19, the tip of the guide pin 79L is in the shape of a hook and has an upper hook portion 79La serving as a retaining portion. FIGS. 20 and 21 are perspective views of the upper-path forming member 57 viewed from diagonally above and below, respectively, in which a part of an end of the guide rail 77L to be engaged with the guide pin 79L provided on the arm 74L is enlarged. The guide rail 77L provided in the inner surface of the upper-path forming member 57 has, at the end, a lower hook portion 77La serving as a retaining portion.

Figure 22:
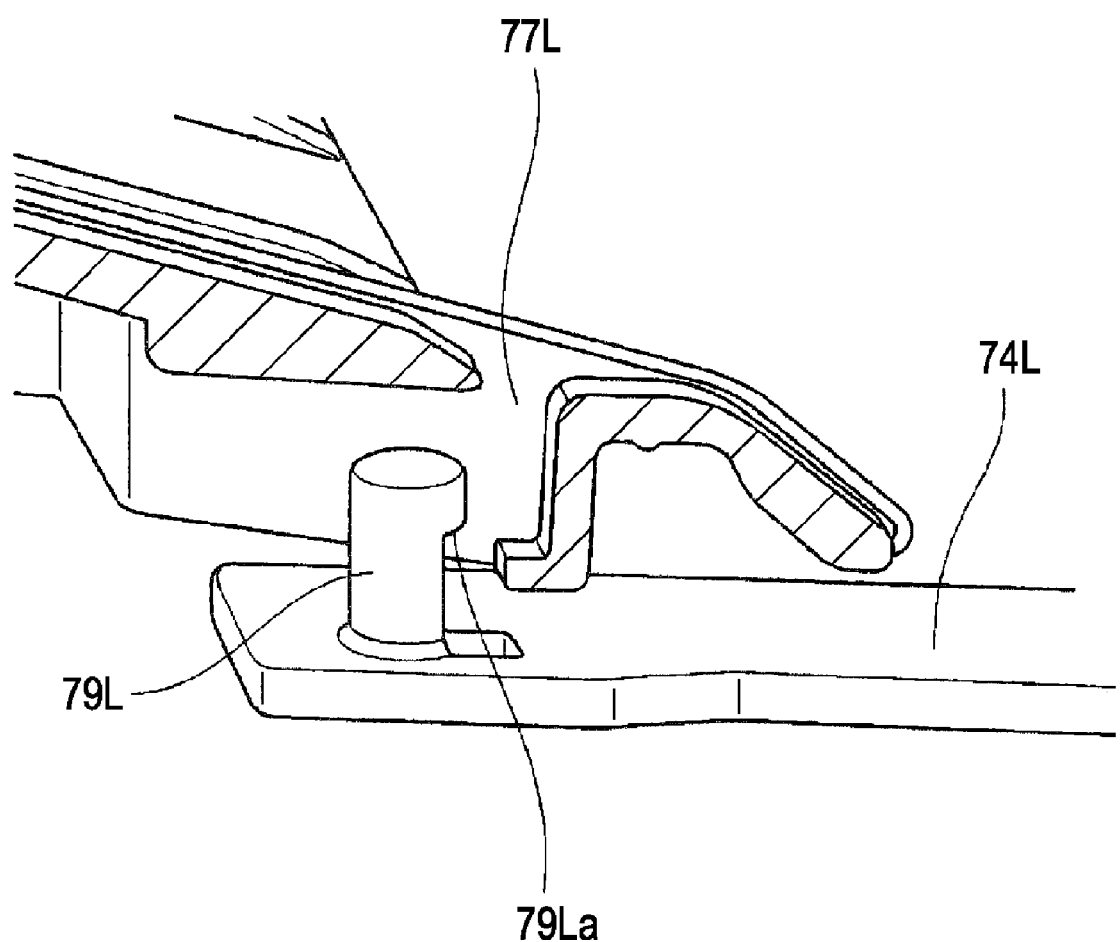
FIG. 22 is a perspective view showing the relationship between the arm and the guide rail immediately before the arm is fully extended.

FIG. 22 shows the relationship between the arm 74L and the guide rail 77L immediately before the tray 55 moves to the set position 53. When the tray 55 has moved to the set position 53, the guide pin 79L comes into contact with the tip of the guide rail 77L, limiting the movement of the tray 55 toward the discharge unit side. Even if the tray 55 located at the set position 53 is further pulled toward the discharge unit side by unexpected force or is moved downward by vibration, the upper hook portion 79La of the guide pin 79L shown in FIG. 22 and the lower hook portion 77La of the guide rail 77L engage with each other to prevent the arm 74L from coming off the guide rail 77L. Although this embodiment is configured to leave a gap (clearance) between the upper hook portion 79La and the lower hook portion 77La when the tip of the guide rail 77L and the guide pin 79L are in contact, the upper hook portions 79a may be provided so as not to leave such a gap.

FIGS. 23 to 26 are partial enlarged views of the arm 74R and the guide rail 77R and diagrams showing the relationship between the arm 74R and the guide rail 77R immediately before the tray 55 moves to the set position 53.

Figure 23:
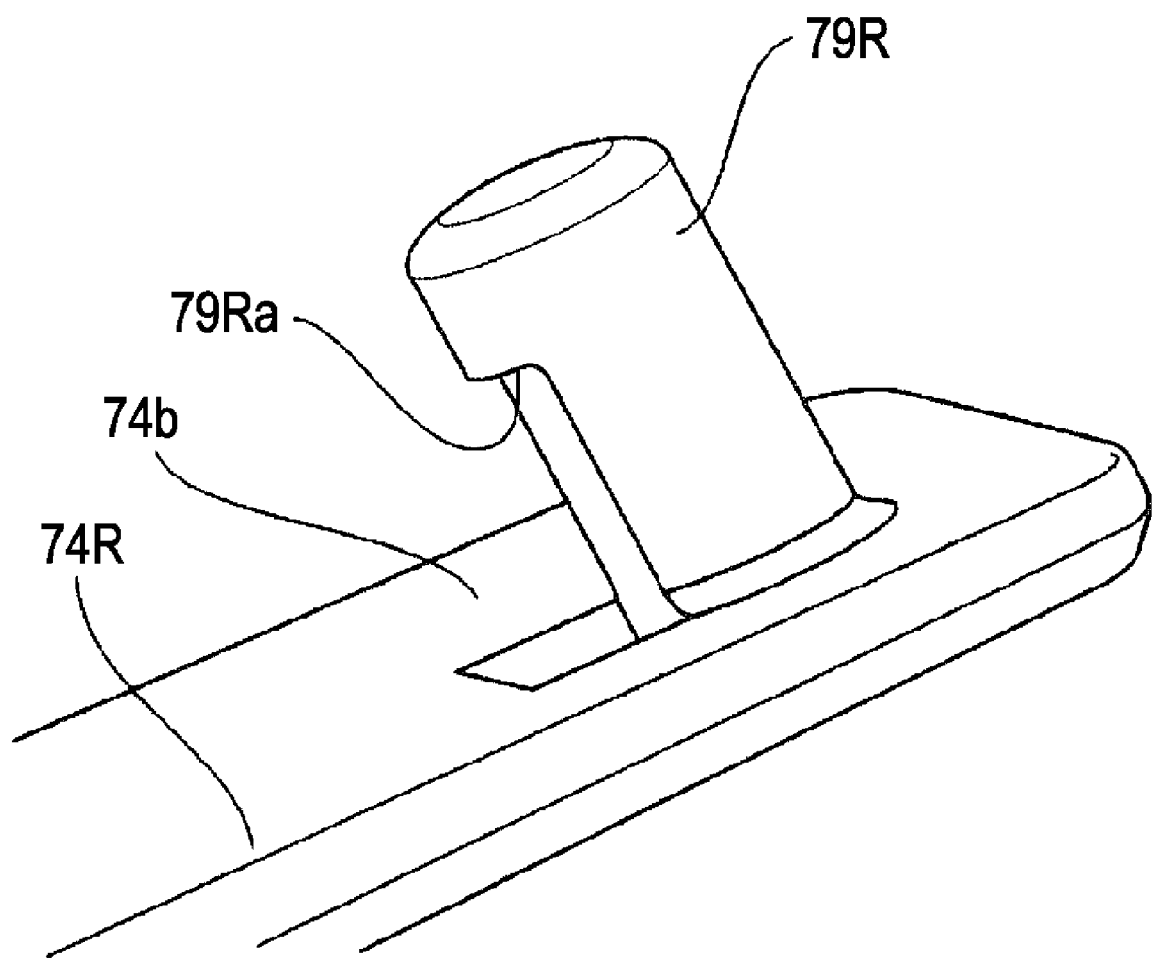
FIG. 23 is an enlarged perspective view of the vicinity of the base end and the guide pin, when the arm is turned upside-down.

FIG. 23 is an enlarged perspective view of the vicinity of the base end 74b and the guide pin 79R, showing the arm 74R in FIG. 8 in an upside-down state. As shown in FIG. 23, the tip of the guide pin 79R is in the shape of a hook and has a lower hook portion 79Ra serving as a retaining portion.

Figure 24:
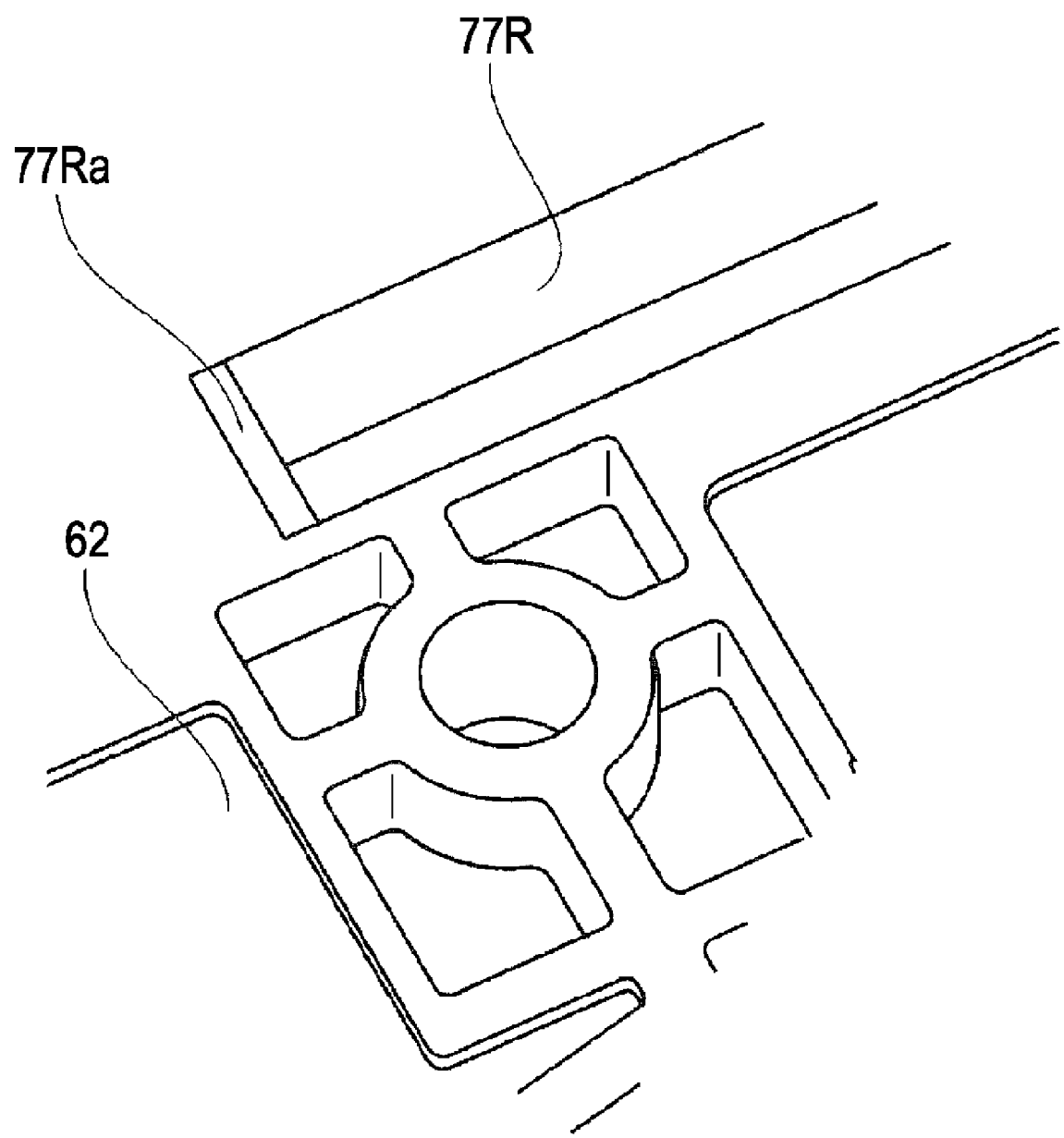
FIG. 24 is a perspective view of a lower-path forming member viewed from diagonally above, in which a part of an end of the guide rail to be engaged with the guide pin provided on the arm is enlarged.
Figure 25:
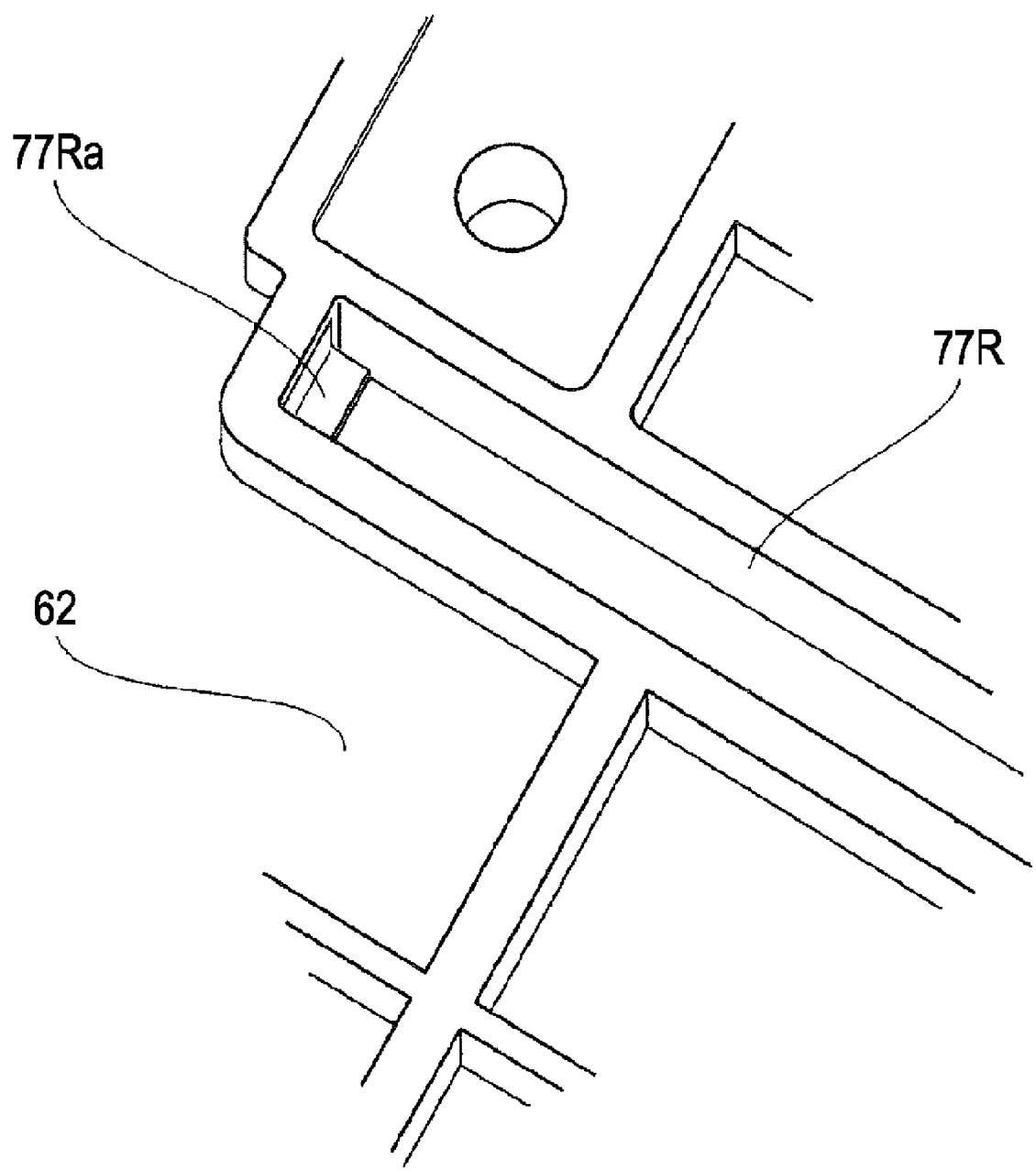
FIG. 25 is a perspective view of a lower-path forming member viewed from diagonally below, in which a part of an end of the guide rail to be engaged with the guide pin provided on the arm is enlarged.

FIGS. 24 and 25 are perspective views of the lower-path forming member 62 viewed from diagonally above and below, respectively, in which a part of an end of the guide rail 77R to be engaged with the guide pin 79R provided on the arm 74R is enlarged. The guide rail 77R provided in the top surface of the lower-path forming member 62 has, at the end, an upper hook portion 77Ra serving as a retaining portion.

Figure 26:
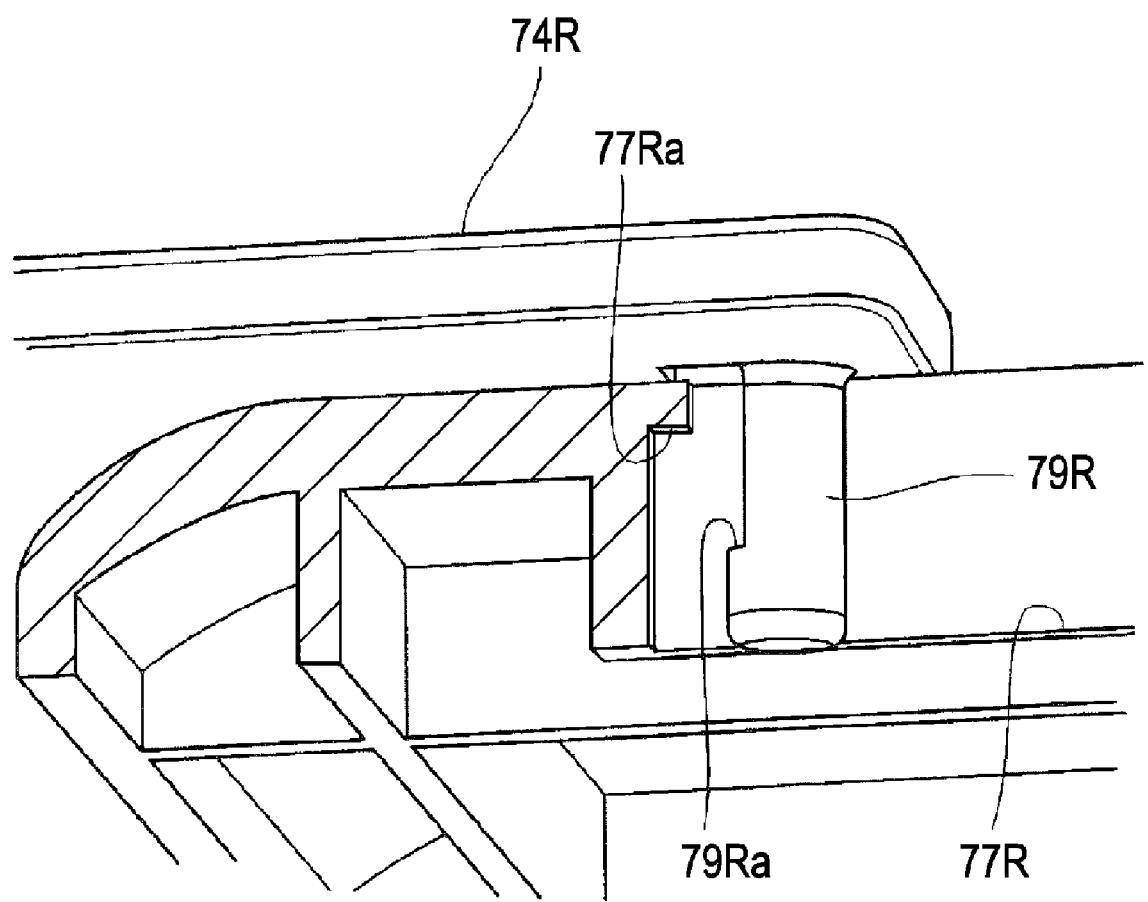
FIG. 26 is a perspective view showing the relationship between the arm and the guide rail immediately before the arm is fully extended.

FIG. 26 shows the relationship between the arm 74R and the guide rail 77R immediately before the tray 55 moves to the set position 53. When the tray 55 has moved to the set position 53, the guide pin 79R comes into contact with the tip of the guide rail 77R, limiting the movement of the tray 55 toward the discharge unit side. Even if the tray 55 located at the set position 53 is further pulled toward the discharge unit side by unexpected force or is moved upward by vibration, the lower hook portion 79Ra of the guide pin 79R shown in FIG. 26 and the upper hook portion 77Ra of the guide rail 77R engage with each other to prevent the arm 74R from coming off the guide rail 77R. Although this embodiment is configured to leave a gap (clearance) between the lower hook portion 79Ra and the upper hook portion 77Ra when the tip of the guide rail 77R and the guide pin 79R are in contact, the upper hook portions 79a may be provided so as not to leave such a gap.

As has been described, by preventing the guide pins 79L and 79R of the arms 74L and 74R from coming off the guide rails 77L and 77R with the hook-shaped retaining portions when the tray 55 has moved to the set position 53, the tray 55 is also prevented from coming off the printer main body 2.

In the above-described retaining structure, the upper hook portion 79La and the lower hook portion 79Ra are provided at the tips of the guide pins 79L and 79R of the arms 74L and 74R, respectively, and the lower hook portion 77La and the upper hook portion 77Ra are provided at the tips of the guide rails 77L and 77R, respectively, so that the arms 74L and 74R and the guide rails 77L and 77R are engaged. However, as long as the arms 74L and 74R can be prevented from coming off the guide rails 77L and 77R, the retaining structure is not limited to that having a hook structure as described above.

The operation of the recording-medium transportation unit 5 when the tray 55 returns from the set position 53 to the stored position 54 is the same as that when the tray 55 moves from the stored position 54 to the set position 53 except that the operation proceeds in reverse order.

Second Embodiment

Although the structure of the ink jet printer 1 having the recording-medium transportation unit 5 of the invention, serving as a recording apparatus, is basically as described above, the structure may of course be partially modified or omitted within the scope of the invention.

For example, as shown in FIG. 17, the arms 74 do not have to be connected to the tray 55 at the left and right rear corners of the tray 55, but may be at the central portion of the rear end of the tray 55. FIG. 17 shows an extendable moving mechanism 59A that moves like a pantograph and has the left and right arms 74L and 74R each consisting of two arm elements, namely, arm elements 89A and 90A and arm elements 89B and 90B. The left and right arms 74L and 74R are each bent at fulcrums 88L and 88R.

Third Embodiment

The extendable moving mechanism 59 is not limited to one having the above-described arms 74. For example, as shown in FIG. 18, the extendable moving mechanism 59 may be an extendable moving mechanism 59B in which a plurality of linkage pieces 91 are connected so as to be pivotable in a chain form or a shutter form. In FIG. 18, the extendable moving mechanism 59B is configured such that the linkage pieces 91 are rolled upward in the space between the tray 55 and the upper-path forming member 57.

The width of the linkage pieces 91 may be either small or large. In the case of the linkage pieces 91 with a small width, a plurality of sets of the linkage pieces 91 may be provided (for example, two sets of the linkage pieces 91 may be provided at the left and right rear corners of the tray 55). On the other hand, if the width of the linkage pieces 91 is increased to the maximum extent, that is, to the same width as the tray 55, a shutter-like extendable moving mechanism 59B is obtained. The linkage pieces 91 do not necessarily have to be rolled upward, but may be rolled downward, leftward, or rightward.

Other Embodiments

Furthermore, for example, the transportation path for the soft recording material P is not limited to the above-described U-shaped reversing path 50, but may be a straight transportation path that transports the soft recording material P from the feeding tray provided at a rear upper portion of the printer main body 2 toward the discharging stacker 47 projecting from the front surface 2a of the printer main body 2.

Furthermore, a recording-medium transportation unit or an ink jet printer dedicated for hard recording materials, which has no transportation path for soft recording materials, is also possible. In addition, the recording-medium transportation unit 5 of the invention may be applied to devices other than the ink jet printer 1, for example, DVD players or personal computers.

Furthermore, the structure of the extendable moving mechanism 59 may be, in addition to one employing two arms 74L and 74R and two guide rails 77L and 77R as described above, one employing three or more arms 74 and three or more guide rails 77 or one employing only one arm 74 and one guide rail 77.

What is claimed is:

1. A recording apparatus comprising:
a tray in which a recording material is to be set, the tray being reciprocated between a first position where the tray is exposed to allow the recording material to be set therein and a second position shifted from the first position in a first direction, where the tray is stored;
a transporting mechanism that applies transportation force for reciprocating the tray; and
a transportation-force transmitting member that is connected to the tray to mediate transmission of the transportation force to the tray and is capable of increasing or decreasing a space occupied by the transportation-force transmitting member in the direction of reciprocation, wherein an orientation of the transportation-force transmitting member is changed when the tray is reciprocating to change a position of the transportation-force transmitting member.

2. The recording apparatus according to claim 1, further comprising a recording unit that performs recording on the recording material set in the tray while transporting the tray in a recording area between the first position and the second position,
wherein the transportation force is directly transmitted from the transporting mechanism to the tray when the tray moves in the recording area, and
wherein the transportation force is applied from the transporting mechanism to the tray via the transportation-force transmitting member when the tray moves from an end of the recording area to the first position.

3. The recording apparatus according to claim 2,
wherein the transporting mechanism includes a driving roller that comes into contact with the tray and the transportation-force transmitting member to apply the transportation force, and
wherein a surface of the transportation-force transmitting member to be in contact with the driving roller is a flat surface.

4. The recording apparatus according to claim 1,
wherein the transportation-force transmitting member includes a linkage with one end being connected to the tray.

5. The recording apparatus according to claim 1,
wherein the transportation-force transmitting member includes an arm connected to the tray at one end, the arm being rotated so as to change the inclination thereof with respect to the direction of reciprocation.

6. The recording apparatus according to claim 5, further comprising a guide portion that guides the change of the inclination of the arm.

7. The recording apparatus according to claim 6,
wherein the guide portion engages with a guided portion formed at the other end of the arm to guide the guided portion along a path corresponding to the change of the inclination.

8. The recording apparatus according to claim 7, further comprising a disengagement preventing portion that prevents disengagement of the guided portion and the guide portion.

9. The recording apparatus according to claim 5,
wherein the arm includes a first arm and a second arm, and
wherein the first arm and the second arm overlie each other when the tray is located at the second position.

10. The recording apparatus according to claim 5,
wherein the arm includes a first arm and a second arm,
wherein a first tray guide member and a second tray guide member that are opposed to each other to guide reciprocation of the tray are provided, and
wherein the first tray guide member includes a first guide portion that guides the first arm, and the second tray guide member includes a second guide portion that guides the second arm.

11. A recording apparatus comprising:
a tray in which a recording material is to be set, the tray being reciprocated between a first position where the tray is exposed to allow the recording material to be set therein and a second position shifted from the first position in a first direction, where the tray is stored;
a transporting mechanism that applies transportation force for reciprocating the tray;
a transportation-force transmitting member that is connected to the tray to mediate transmission of the transportation force to the tray and includes an arm member;
a first state of the arm member where the arm member extends in a direction that the tray reciprocates; and
a second state of the arm member where the arm member extends in a direction that intersects the direction in which tray reciprocates such that a position of the arm member in the first state is different from the position of the arm member in the second state.

* * * * *